US009618747B2

(12) United States Patent
Villmer

(10) Patent No.: US 9,618,747 B2
(45) Date of Patent: Apr. 11, 2017

(54) HEAD MOUNTED DISPLAY FOR VIEWING AND CREATING A MEDIA FILE INCLUDING OMNIDIRECTIONAL IMAGE DATA AND CORRESPONDING AUDIO DATA

(71) Applicant: Jason Villmer, Naples (IT)

(72) Inventor: Jason Villmer, Naples (IT)

(*) Notice: Subject to any disclaimer, the term of this patent is extended or adjusted under 35 U.S.C. 154(b) by 1 day.

(21) Appl. No.: 14/207,412

(22) Filed: Mar. 12, 2014

(65) Prior Publication Data
US 2015/0077416 A1     Mar. 19, 2015

Related U.S. Application Data

(60) Provisional application No. 61/779,348, filed on Mar. 13, 2013.

(51) Int. Cl.
*G09G 5/00* (2006.01)
*G02B 27/01* (2006.01)
*G06F 3/01* (2006.01)
*G06T 11/60* (2006.01)

(52) U.S. Cl.
CPC .......... *G02B 27/017* (2013.01); *G06F 3/012* (2013.01); *G06T 11/60* (2013.01); *G02B 2027/014* (2013.01); *G02B 2027/0138* (2013.01); *G02B 2027/0178* (2013.01); *G02B 2027/0187* (2013.01); *G06T 2207/10004* (2013.01); *G06T 2207/10016* (2013.01); *G06T 2219/2016* (2013.01)

(58) Field of Classification Search
CPC .......... G02B 27/017; G02B 2027/0178; G02B 2027/0138; G02B 27/01; G06F 3/165; G06F 3/167

USPC ................................................ 345/7, 8, 633
See application file for complete search history.

(56) References Cited

U.S. PATENT DOCUMENTS

| 4,796,987 A * | 1/1989 | Linden .................. 351/158 |
| 6,943,755 B1 * | 9/2005 | Bartow .................. 345/8 |
| 2011/0213664 A1 * | 9/2011 | Osterhout et al. ......... 705/14.58 |

OTHER PUBLICATIONS

Smolic'et al. , Interactive 3-D Video Representation and Coding Technologies, Jan. 2005, Proceedings of the IEEE, vol. 93, No. 1, p. 98-110.*

* cited by examiner

*Primary Examiner* — Robert Craddock
(74) *Attorney, Agent, or Firm* — The Law Office of Adam L. Bagwell, LLC; Adam L. Bagwell

(57) ABSTRACT

A compact, lightweight, self-powered head mounted display device for viewing a media file including omnidirectional image data and corresponding audio data. The device includes a housing configured to be worn on a user's head, a processor, and at least one display for displaying the image data from a processor. The device also includes at least one speaker for playing the audio data to the user. The device also includes a system memory for storing media files for display on the device. The device detects the orientation/position of the user's head and updates the displayed image and played sound accordingly. The device may also create omnidirectional media files for playback or for use on other devices. The device may send and receive media files utilizing a wired connection, a wireless connection, or both. The device may optionally fold up for compact storage.

14 Claims, 63 Drawing Sheets

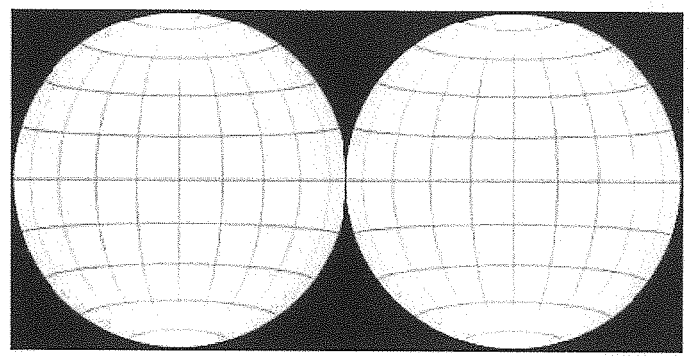
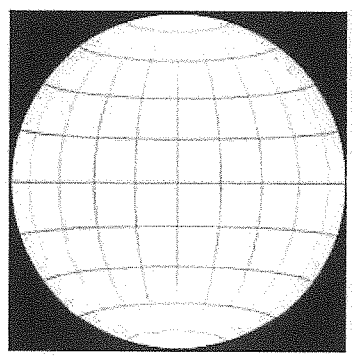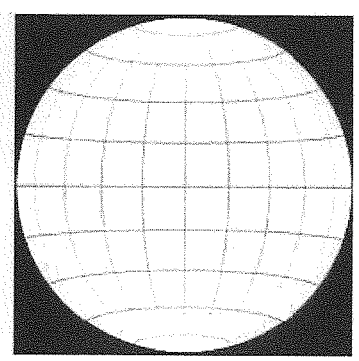
FIG. 14B

```
1.   // © Jason Villmer
2.   internal function init3D(e:Event) : void {
3.      var window:SpriteVisualElement;
4.         window = new SpriteVisualElement();           // create 2D container
5.         window.width = stage.stageWidth;
6.         window.height = stage.stageHeight;
7.      stage.addChild(window);                          // add 2D container to application
8.
9.      var view:View3D;
10.        view = new View3D();                          // create 3D Virtual Environment
11.        view.camera = new Camera3D;                   // create 3D Render Camera
12.        view.camera.position = new Vector3D(0, 0, 0); // center camera
13.        view.camera.zoom = 3.5;                       // set render camera default zoom
14.        view.camera.rotationX = 0;                    // set render camera x-axis rotation
15.        view.camera.rotationY = 0;                    // set render camera y-axis rotation
16.        view.camera.rotationZ = 0;                    // set render camera z-axis rotation
17.     window.addChild(view);                           // add 3D environment to 2D container
18.
19.     var material:VideoMaterial;
20.        material = new VideoMaterial();               // create new video texture material
21.        material.loop = true;
22.        material.smooth = true;
23.        material.file = "data.mov";                   // set Media File source
24.
25.     var sphere:Sphere = new Sphere();                // create new Render Object (sphere)
26.        sphere.material = material;                   // use media file's image data as material
27.        sphere.bothsides=true;
28.        sphere.radius = 2000;
29.        sphere.segmentsW = sphere.segmentsH = 43;     // set render quality
30.        sphere.rotationX = 0;                         // set render object x-axis rotation
31.        sphere.rotationY = 0;                         // set render object y-axis rotation
32.        sphere.rotationZ = 0;                         // set render object z-axis rotation
33.     view.scene.addChild(sphere) }                    // add render object to 3D environment
```

FIG. 51

```
1.   // © Jason Villmer
2.   import com.adobe.nativeExtensions.Gyroscope;
3.   import com.adobe.nativeExtensions.GyroscopeEvent;
4.   import flash.sensors.Accelerometer;
5.
6.   internal var accelerometer:Accelerometer;
7.   internal var gyroscope:Gyroscope;
8.
9.   private function initMotion():void {
10.    accelerometer = new Accelerometer();
11.    // listen for accelerometer events (device rotation on the X axis)
12.    accelerometer.addEventListener(AccelerometerEvent.UPDATE,meterUpdate);
13.    gyroscope = new Gyroscope();
14.    // listen for gyroscope events (device rotation on Y and Z axis)
15.    gyroscope.addEventListener(GyroscopeEvent.UPDATE,gyroUpdate)};
16.
17.   private function meterUpdate(e:AccelerometerEvent):void{
18.    // update render camera X-axis (tilt) rotation
19.    view.camera.rotationX = Math.floor(((e.accelerationX*100)/100)*-90);}
20.
21.   private function gyroUpdate(e:GyroscopeEvent):void {
22.    // update render camera Y-axis (pan) and Z-axis (roll) rotation
23.    view.camera.rotationY += Math.floor(Number(e.y.toFixed(1))*-5)
24.    view.camera.rotationZ += Math.floor(Number(e.z.toFixed(1))*-5)}
```

FIG. 52

HEAD MOUNTED DISPLAY FOR VIEWING AND CREATING A MEDIA FILE INCLUDING OMNIDIRECTIONAL IMAGE DATA AND CORRESPONDING AUDIO DATA

BACKGROUND

A Head Mounted Display (HMD) is a device worn on the head of a user with one or more portions of the device positioned in front of the user's eyes for displaying visual information. The front portion of the device is often opaque to occlude external vision or it may utilize a transparent or semi-transparent material to permit viewing the external world. HMDs are commonly comprised of a wearable housing, one or more micro displays to produce visual data, one or more collimating optical elements to visually transmit image data from the displays to the user and one or more speakers or headphones to transmit audio to the user. HMDs may contain a Head Tracking device to monitor the orientation of the user's head and change the display content based on any orientation changes. Two common display types are Liquid Crystal Displays (LCDs) and Organic Light Emitting Diodes (OLEDs) displays, each having their own benefits and drawbacks. LCDs, for example, must use a backlight to operate properly, whereas an OLED has the capacity to independently produce its own light. OLEDs generally require less power to operate, as the backlight of the LCD requires significant power consumption. OLEDs are also thinner than LCDs, allowing OLED-based devices to be more compact in size and shape. One drawback of an OLED, however, is that they generally have a shorter lifetime of operation.

HMDs typically employ either a monocular or binocular construction, where a monocular HMD transmits the image from a single display to a single eye of the user, while a binocular HMD includes two individual monoculars, one for each eye, with each monocular consisting of an eyepiece and a display. An HMD containing a single display may utilize an optical arrangement to simultaneously create two identical images from the single image and transmit each independent image to an individual eye. HMDs may use either a simple magnifier or compound microscope approach for its optical design. The simple magnifier approach, suitable for most HMDs, uses a single lens to visually transmit information from the display to user. The compound microscope approach uses two lenses and is used for more advanced HMDs.

A common limitation of existing HMDs is that they depend on separate electronic devices, such as PCs or mobile devices, to receive both power and audio/visual data. This often means that the HMD is physically tethered to a computer via one or more cables. Furthermore, existing HMDs do not provide, among other things, internal data storage capabilities, wireless communication capabilities, a computer processor or an operating system to run software programs specifically designed to utilize the unique capabilities of the HMD. While existing HMDs may be used to view content derived from computers and separate devices, they are typically so complex that the general public cannot easily use the HMDs. As a result, HMDs have yet to be adopted on a wide scale. Furthermore, widespread adoption of HMDs has been hampered by the lack of a HMD device that is specifically designed to support new media formats that can fully utilize the unique advantages a wearable HMD can offer, for example, immersive experiences using omnidirectional media.

Omnidirectional Media, such as panoramic images and video, contains image or video data that contains a substantially large field of view of a recorded environment. Omnidirectional media may be created using different methods, such as using a mirrored camera mount, a single camera, or multiple cameras with each camera pointed in a different direction for simultaneously recording image data from multiple angles. Multiple cameras may also be integrated into a single housing, containing both a battery and housing, allowing the device to be both self-powered and portable. These recording systems, also known as omnidirectional cameras, may be designed to capture a single photograph or full motion video. Omnidirectional cameras may also include multiple microphones with each microphone pointed in a different direction to simultaneously record audio data from different angles. In other words, a omnidirectional Camera may record both omnidirectional image data and corresponding omnidirectional audio data. An omnidirectional media file us considered "spherical" if its image data collectively contains a 360° degree horizontal field of view and a 180° vertical field of view. The visual format of an omnidirectional image may vary depending on the device or devices used to generate the omnidirectional image. A file containing omnidirectional image data may, for example, visually place the image data from each camera edge-to-edge or it may instead utilize a specialized process to visually transform and combine the image data from each camera into a single, unified image. One example of such an image is an equirectangular image, where the image data of two or more cameras have been transformed and seamlessly combined, or "stitched", into a single combined image with a structural aspect ratio of 2:1 and image data containing a complete 360° horizontal by 180° vertical field of view.

At present, a user uses a software application known as an Omnidirectional Media Viewer (ODMV) in order to view a media file containing omnidirectional image data. ODMVs are specialized software applications for viewing omnidirectional media and are developed to operate on a number of different computing environments. For example, ODMVs may operate as desktop applications, web applications, or as mobile application for devices such as phones and tablets. Each ODMV may be specifically designed to support one or more omnidirectional media formats, such as the equirectangular format. A fundamental problem with the current ODMVs and other viewing solutions, however, is that they do not produce a deep sense of realistic immersion as one would in real life. This is because we do not naturally view the world around us through a small, distant window, like that of computer monitor, phone or tablet. Instead, we experience the world through our eyes and we can change what we see simply by moving our head. Due to these significant limiting factors, HMDs and ODMVs are not being embraced by consumers and the general public.

SUMMARY

The following presents a simplified summary in order to provide a basic understanding of some aspects of the invention. This summary is not an extensive overview. It is not intended to identify key or critical elements of the invention or to delineate the scope of the invention. The following summary merely presents some concepts of the invention in a simplified form as a prelude to the more detailed description provided below.

A head mounted display device ("HMD" or "device") for viewing a media file including omnidirectional image data and corresponding audio data embodying aspects of the invention comprises a housing configured to be worn on a user's head with one or more portions of the housing positioned in front of the user's eyes. The device further comprises a computer processor located inside the housing, a power source, and at least one display for receiving image data from the processor and displaying the received image data to the user. The device further comprises at least one speaker for receiving audio data from the processor and playing the received audio data to the user, at least one input control for receiving user input, with the input control being located on the exterior of the housing, and an orientation information acquisition device for measuring the rotation of the device about its x-axis, y-axis and z-axis. The device additionally comprises a system memory having stored thereon computer-processor executable instructions for operating the head mounted device, with the computer-processor executable instructions comprising instructions for displaying a media file including omnidirectional image data and corresponding audio data in a media viewer executing on the device via the at least one display.

According to other aspects, the computer-processor executable instructions further comprise instructions for creating a media file containing omnidirectional image data and corresponding audio data. The instructions include instructions for acquiring image data synchronously from each camera, acquiring audio data from each microphone synchronously with the image data, acquiring file metadata describing one or more properties of the media file, and acquiring orientation metadata from the orientation information acquisition device describing one or more rotational properties of the head mounted display device. The instructions additionally include instructions for creating a media file container, processing the image data from the cameras, creating at least one media file track containing audio data from at least one microphone, creating at least one media file track containing the file metadata, creating at least one media file track containing the acquired orientation metadata, encoding the processed image data and the acquired audio data, and then saving the media file to a system memory. According to other aspects, processing the image data comprises at least one of cropping the image data from at least one of the cameras, scaling the image data from at least one of the cameras, rotating the image data from at least one of the cameras, adjusting one or more visual properties of the image data from at least one of the cameras, with the visual properties comprising one or more of color, brightness, and contrast, correcting for vignette features of the image data from at least one of the cameras, applying one or more visual transformations to the image data of at least one of the cameras, masking the image data from at least one of the cameras, combining the image data from at least two cameras, and creating at least one media file track containing image data from at least one camera;

According to aspects, the head mount display device further comprises a Global Positioning System and the computer-processor executable instructions include instructions for creating a media file containing omnidirectional image data and corresponding audio data, including acquiring location metadata from the Global Positioning System describing the global position of the device and creating at least one media file track containing the acquired location metadata.

BRIEF DESCRIPTION OF THE DRAWINGS

A more complete understanding of aspects of the present invention and the advantages thereof may be acquired by referring to the following description in consideration of the accompanying drawings, in which like reference numbers indicate like features, and wherein:

FIG. 14B illustrates an example of image data from multiple cameras being combined together in a side-by-side fashion to form a single image and/or added separately to a media file as individual tracks.

FIG. 51 illustrates an example set of computer program instructions for creating a virtual environment, a render camera, and a render object, and applying the image data of a media file as a texture to the surface of the render object.

FIG. 52 illustrates an example set of computer program instructions for rotating a render camera based on data from a orientation information acquisition device of a HMD, e.g., a gyroscope and/or an accelerometer.

DETAILED DESCRIPTION

In the following description of the various embodiments, reference is made to the accompanying drawings, which form a part hereof, and in which is shown by way of illustration various embodiments in which features may be practiced. It is to be understood that other embodiments may be utilized and structural and functional modifications may be made.

Figure 1:
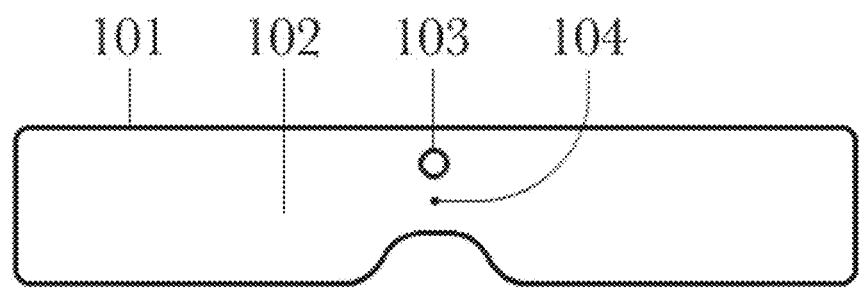
FIG. 1 illustrates a front view of an embodiment of a HMD according to various aspects described herein.
Figure 62:
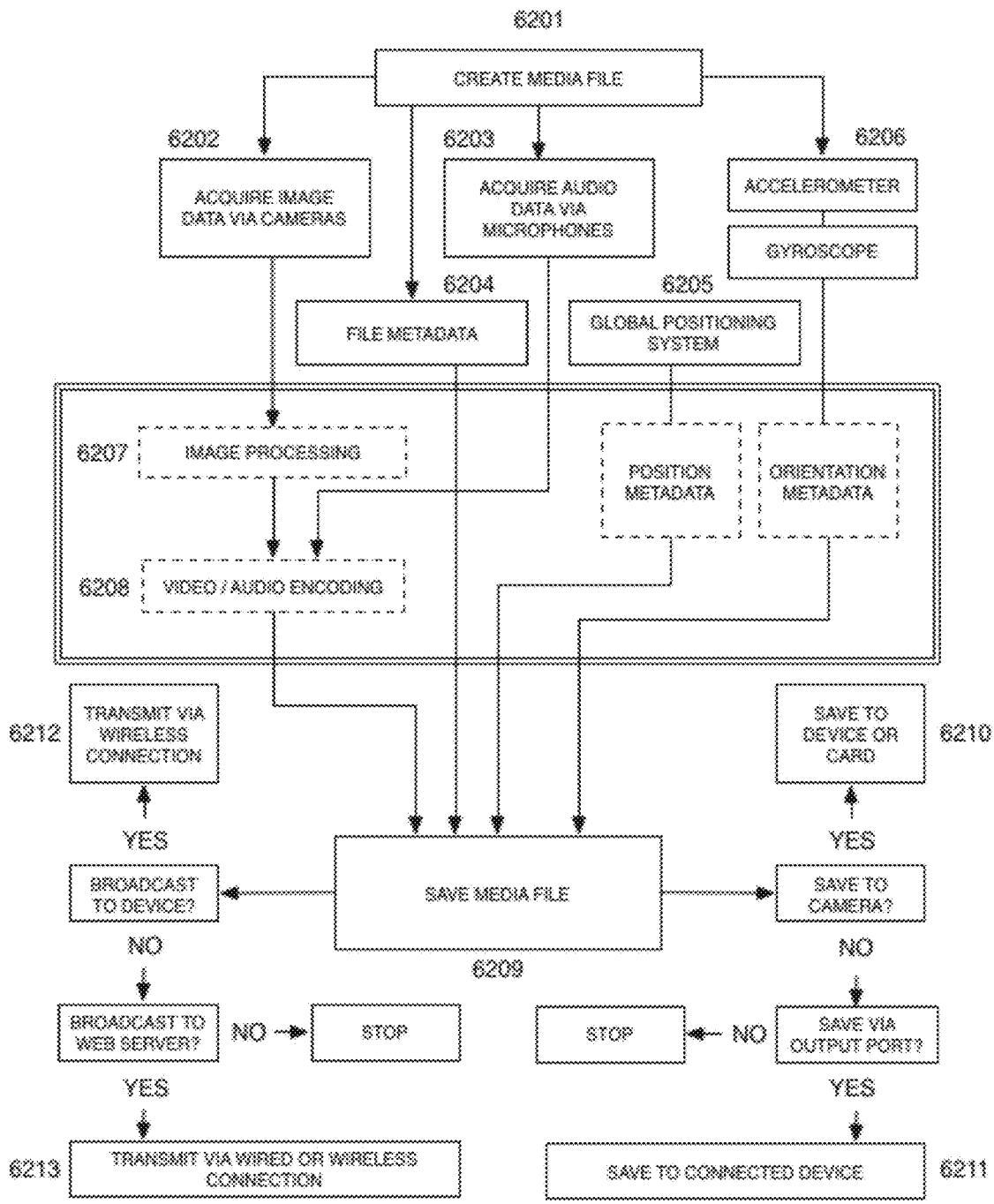
FIG. 62 illustrates an exemplary process for creating a media file with image data acquired from a plurality of cameras, audio data acquired from a plurality of microphones, metadata acquired from an integrated Global Positioning System and metadata acquired from an integrated Orientation Information Acquisition Device.

Embodiments of the invention include a HMD as a self-powered, wearble device for viewing media files containing omnidirectional image data and corresponding audio data using one or more displays, such as but not limited to, Liquid Crystal Displays (LCDs) or Organic Light Emitting Diodes (OLEDs) and one or more speakers or earphones, as illustrated in FIGS. 1-62 and described below. Image data may refer to a single image or a video comprised of multiple images. Media files containing omnidirectional image and audio data are generally created by using multiple cameras and microphones to simultaneously record visual and audio data from multiple directions. In some embodiments, the invention includes a plurality of cameras and a plurality of microphones to create media files including omnidirectional image data and corresponding audio data.

Embodiments of device 101 may include a special purpose or general purpose computer and/or computer processor including a variety of computer hardware, as described in greater detail below. Embodiments of device 101 may further include one or more computer-readable storage media having stored thereon firmware instructions that the computer executes to operate the device as described below. In one or more embodiments, the computer and/or computer processor are located inside the device 101, while in other embodiments, the computer and/or computer processor are located outside or external to device 101.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage, or other magnetic storage devices, or any other medium that can be used to carry or store desired program code means in the form of computer-executable instructions or data structures and that can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

In one embodiment, the device 101 includes a housing frame configured to be worn on the user's head with one or more portions of the housing positioned in front of the user's eyes. In some embodiments, the front portion of the housing may be opaque to occlude external vision. In other embodiments, the front portion of the housing is comprised of a transparent or semi-transparent material. One or more optical components are positioned within the housing for visually transmitting the image data from each display to the front portion of the device. This would include using lenses, mirrors, prisms or any other suitable optical components in order to magnify, reflect or otherwise transfer the visual information from the displays to one or more areas of the device seen by the user According to aspects of the invention, the device 101 comprises a computer processor to, among other things, allow independent operation of the device and the capacity to run software applications for creating and viewing media files including omnidirectional image data and corresponding audio data. In order to view media files including omnidirectional data, the processor executes an application stored on a computer-executable media herein referred to as an "Omnidirectional Media Viewer" or "Media Viewer". In some embodiments, the device 101 utilizes a custom Operating System (OS) or an open source operating system, such as Android.

Figure 6:
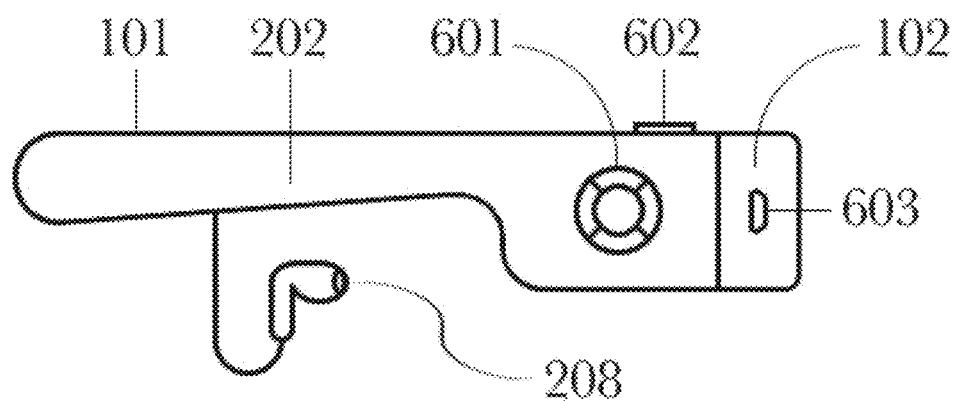
FIG. 6 illustrates a right view of an embodiment of a HMD according to various aspects described herein.

In some embodiments, the device 101 includes an integrated Orientation Information Acquisition Device commonly referred to as an "Head Tracker" (not illustrated), to precisely track the head movements of the wearer. For example, a head tracker may include an accelerometer, a gyroscope, or both, for generating orientation data based on the rotational position of the device 101 along the x-axis, y-axis and z-axis. The processor utilizes the received orientation data from the head tracking system to simultaneously update the visual and audio data to the user via the displays and speakers One embodiment of the invention, as illustrated in FIG. 6, will have at least one input control 601, located on the exterior of the device, allowing the device to receive user input. These input controls would allow the user to interact with the device, such as controlling a user interface or the media viewer. Examples of user input controls include buttons, track balls, rollers, sliders, switches and other interactive components capable of being operated by one or more fingers of the user. Another example of an ideal input control would be touch-sensitive surfaces located on the exterior of the invention. These surfaces, being constructed and operating in a manner similar to multi-touch trackpads found on modern laptop computers, would utilize touch gestures to perform various actions. Touch-sensitive surfaces would allow a user to conduct both simple and complex functions using various combinations of touch gestures. Gesture examples would include single and multi-finger taps on the surface, single and multi-finger directional swipes and pattern gestures. Pattern gestures would involve touching a surface and moving one or more fingers in a specific pattern, where each unique pattern would perform a specific function. In some embodiments, the invention would provide a number of predefined or "native" gestures while also permitting the user to create their own gestures to perform custom functions.

In some embodiments, the device 101 includes either an integrated power source, an external power source, or both, such as a rechargeable lithium ion battery, positioned inside the housing of the invention. According to aspects of the invention, the power source battery may be charged by using a wireless charger or by connecting the device 101 to a power source via one of its input/output ports, as described below. In some embodiments, the battery is user-replaceable. According to aspects of the invention, the device 101 may optionally utilize one or more LED lights located on the exterior of the housing to visually indicate various operational states of the device. The device 101 may optionally include an integrated vibration device for sending vibration alerts to the user.

FIG. 1 illustrates the front of an embodiment of the device 101 with a structural housing. In this exemplary embodiment, the structural housing resembling a pair of glasses with an opaque exterior 102 designed to occlude external vision. The housing, however, may assume any shape and form suitable for a HMD. For example, the housing may be simple in design, as well as light and portable, so that it can be comfortably worn and carried by a user. In some embodiments, the device 101 may be folded like traditional glasses. In other embodiments, the device 101 includes a rigid, non-foldable housing. The exemplary device 101 in FIG. 1 additionally shows an optional camera 103 and an optional microphone 104 located on the front of the device. One skilled in the art will recognize that the optional camera 103 and optional microphone 104 may be positioned at other points on the housing without departing from the scope of the invention.

Figure 2:
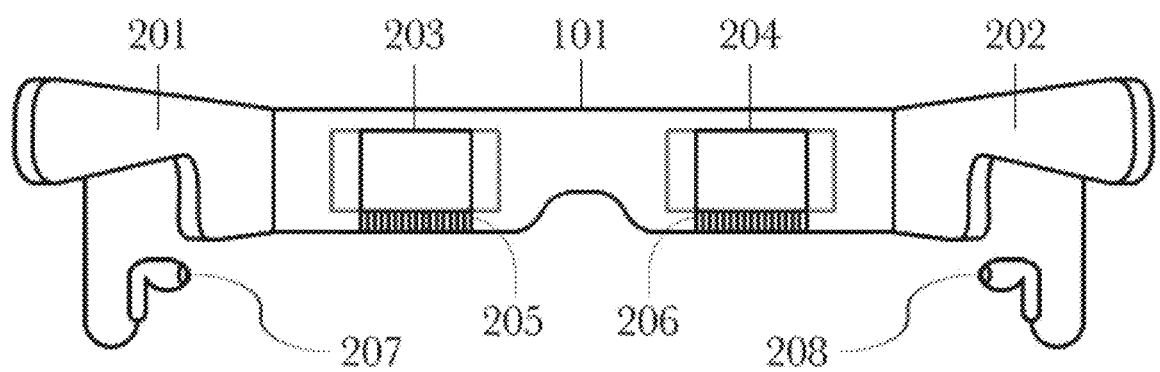
FIG. 2 illustrates a back view of an embodiment of a HMD according to various aspects described herein.
Figure 3:
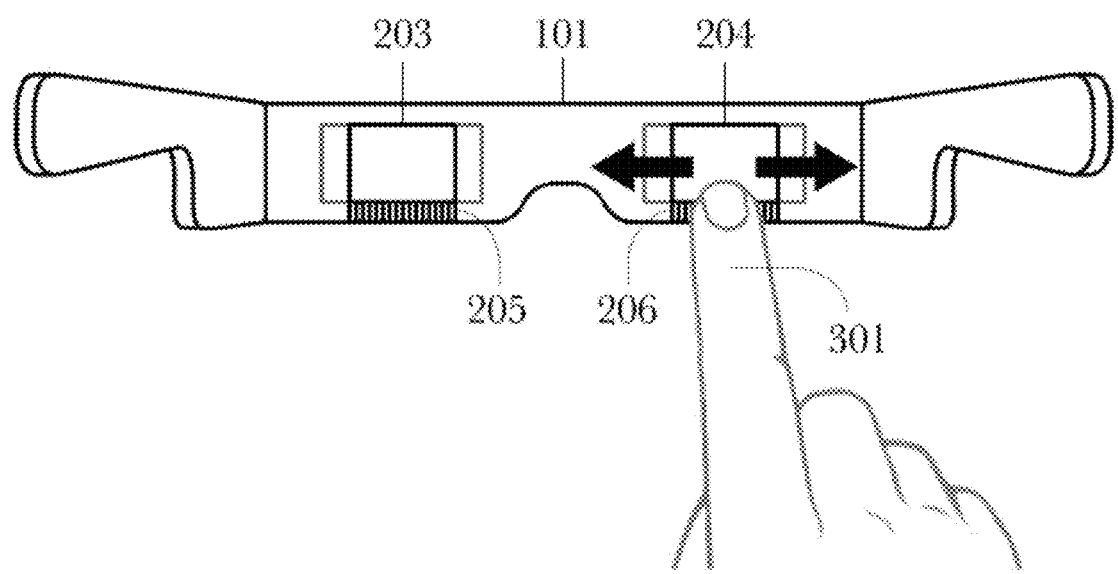
FIG. 3 illustrates an example of a user adjusting the position of one of the displays or optics of a HMD independent of the position of other display or optic.
Figure 4A:
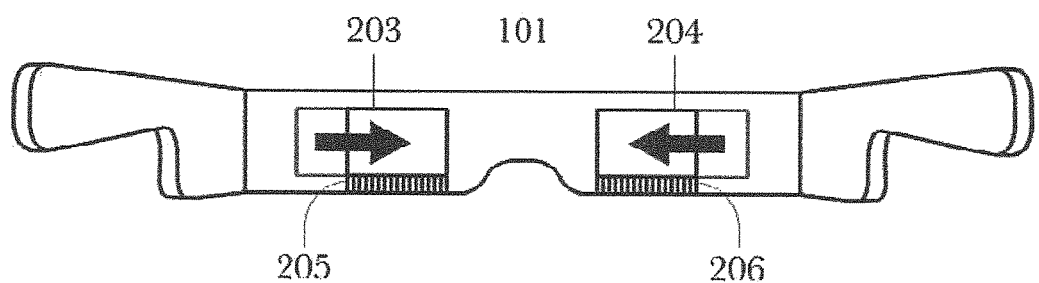
FIGS. 4A and 4B illustrate examples of different independent positioning of the displays or optics of a HMD.
Figure 4B:
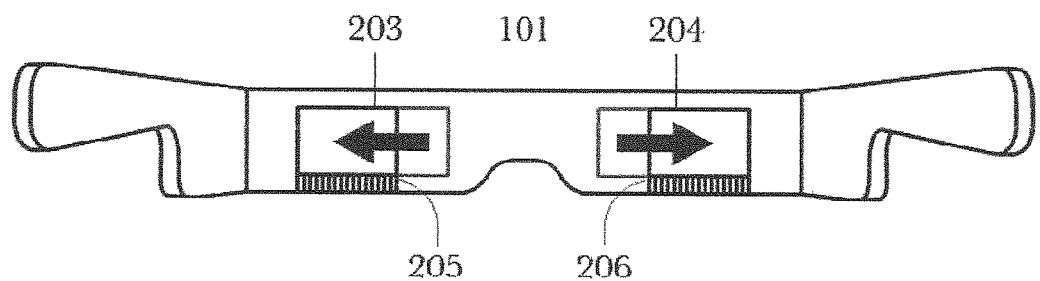

FIG. 2 illustrates the back of an embodiment of the device 101 with left side 201 and right side 202 of the structural housing. In this embodiment, the left side 201 contains an earphone 207 for a user's left ear and the right side 202 includes an earphone 208 for the user's right ear. In other embodiments (not shown), the device 101 includes either earphone 207 or earphone 208, but not both. In some embodiments, device 101 does not include an earphone. The exemplary embodiment in FIG. 2 includes two adjustable displays 203 and 204. Displays 203 and 204 contain corresponding areas 205 and 206 that allow the physical location of each display to be manually adjusted by the user. FIG. 3 illustrates this process, whereby the user's finger 301 adjusts the location of display 204 of the device 101 by dragging the adjustment area 206 left and right. FIG. 4A illustrates exemplary displays that have been adjusted by the user. In FIG. 4A, display 203 has been moved to the right and display 204 has been moved to the left. In FIG. 4B, displays 203 and 204 have been adjusted by the user who has eyes that are farther apart, i.e., display 203 has been moved to the left and display 204 has been moved to the right.

Figure 5:
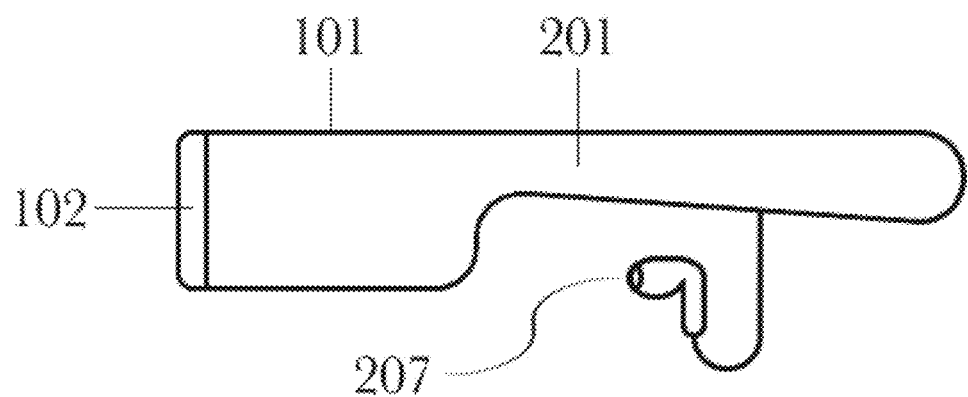
FIG. 5 illustrates a left view of an embodiment of a HMD according to various aspects described herein.
Figure 7:
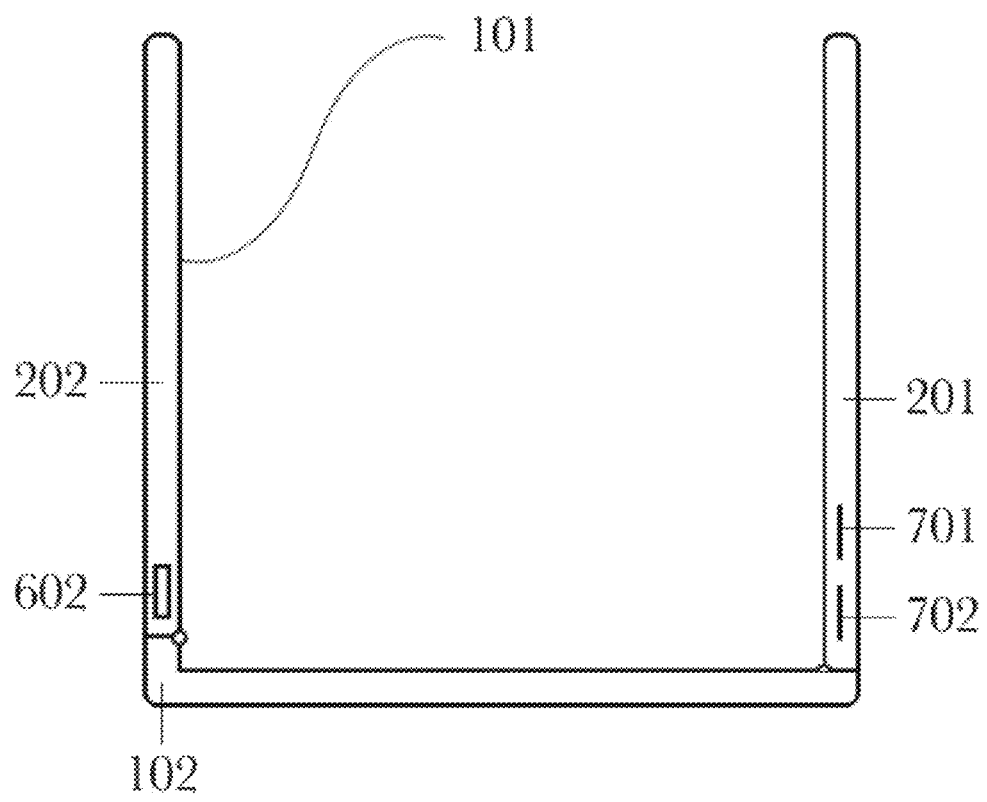
FIG. 7 illustrates a top view of an embodiment of a HMD according to various aspects described herein.

FIG. 5 illustrates the left side 201 of an embodiment of the device 101, showing the front portion 102 of the device 101 and the left earphone 207. FIG. 06 illustrates the right side 202 of an embodiment of the device 101, showing the front portion of the device 102 and the right earphone 208. In this embodiment, right side 202 includes a button 602 for powering on the device, an example input control 601 for receiving input from a user and an input/output port 603 for establishing a wired connection to a computing device or storage device. FIG. 07 illustrates a top view of an embodiment of the device 101 showing the front portion of the device 102, left side 201, right side 202, and power button 602. FIG. 7 additionally shows a card slot 701 for accepting a card-based wireless communication module, such as a cellular SIM card, and a card slot 702 for accepting a card-based storage device, such as an SD Card.

Figure 8:
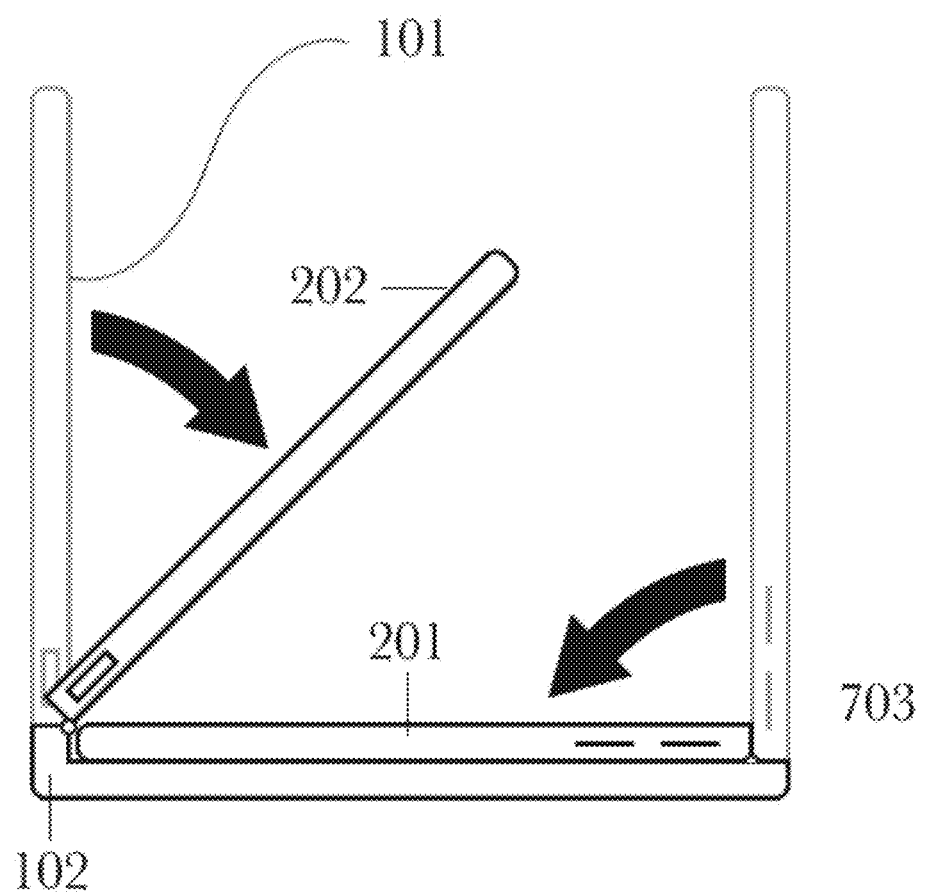
FIG. 8 illustrates an embodiment of a HMD which be folded into a compact form.

FIG. 08 shows the top view of an embodiment of the invention 101 whereby the left side of the device 201 and the right side of the device 202 can be folded to allow the device to assume a more compact form. In this manner, the device 101 is advantageously both portable and convenient to carry, in much the same way someone may easily carry a lightweight pair of reading glasses or sunglasses.

Figure 9:
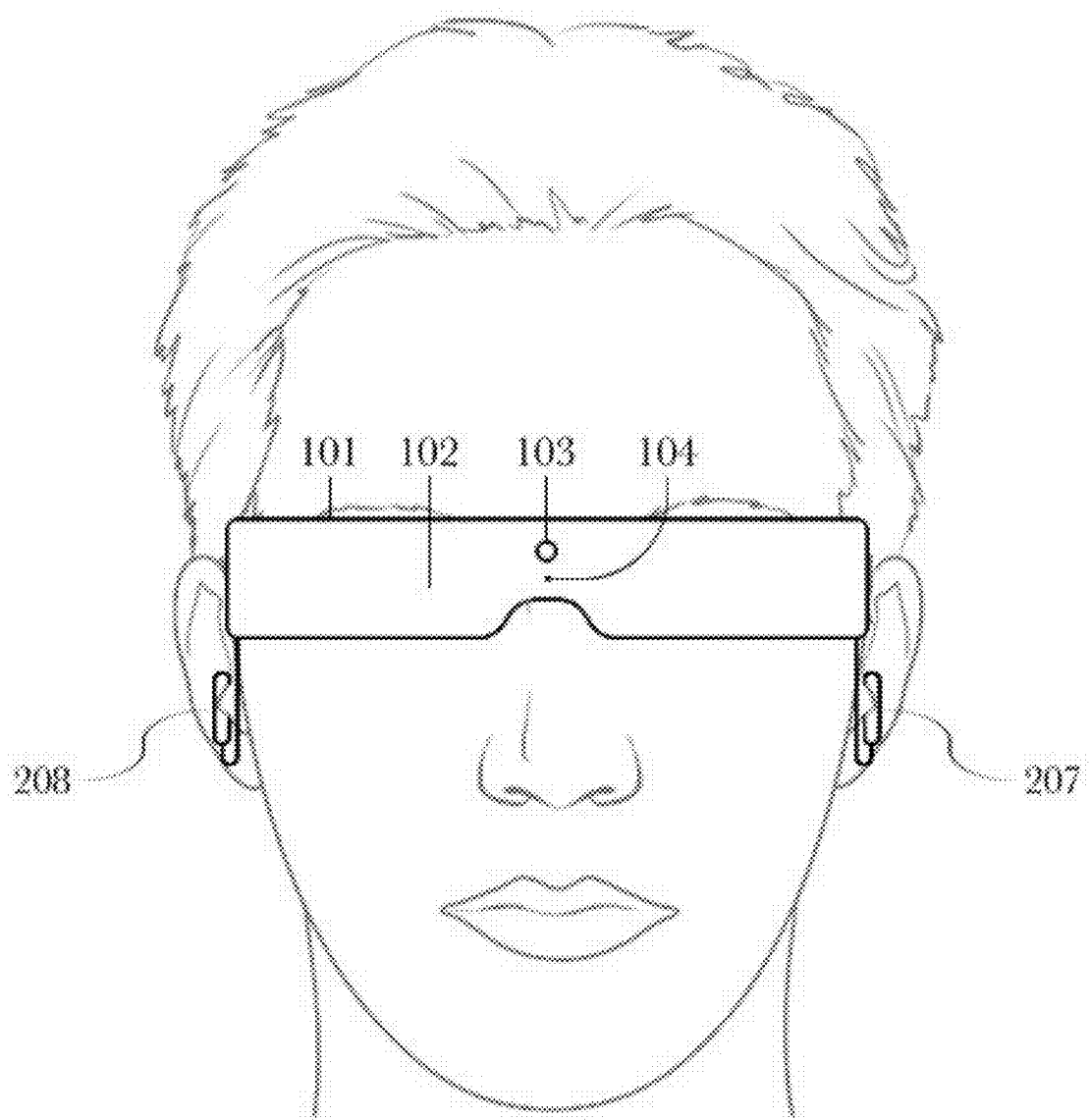
FIG. 9 illustrates a front view of an embodiment of a HMD being worn by a user, with the front portion of the HMD including an opaque material.
Figure 10:
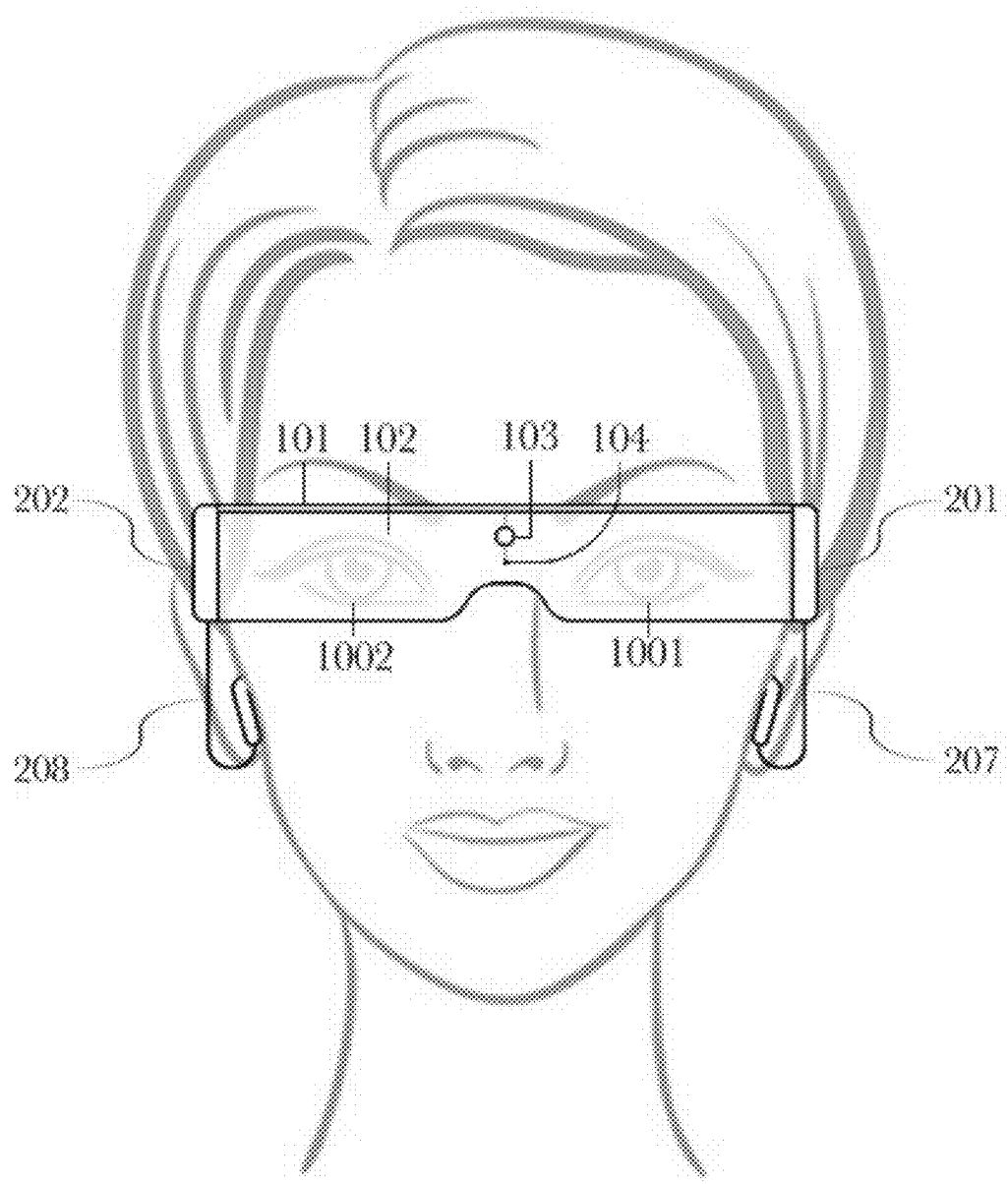
FIG. 10 illustrates a front view of an embodiment of a HMD being worn by a user, with the front portion of the HMD including a transparent material.

FIG. 9 shows an embodiment of the device 101 being worn by a user where the front portion of the device 102 has an opaque exterior that occludes external vision. In this embodiment, displays 203 and 204 are positioned directly behind the opaque front. FIG. 10 illustrates an embodiment of the device 101 worn by a user where the front portion 102 has a transparent or semitransparent exterior. In this embodiment, display 203 is located inside the left side 201 of the device 101 and utilizes one or more optical components, such as mirrors, prisms or other suitable materials, to visually transmit image data to region 1001. Display 204 is located inside the right side 202 of the device 101 and utilizes one or more optical components, such as mirrors, prisms or other suitable materials, to visually transmit image data to region 1002.

Figure 11:
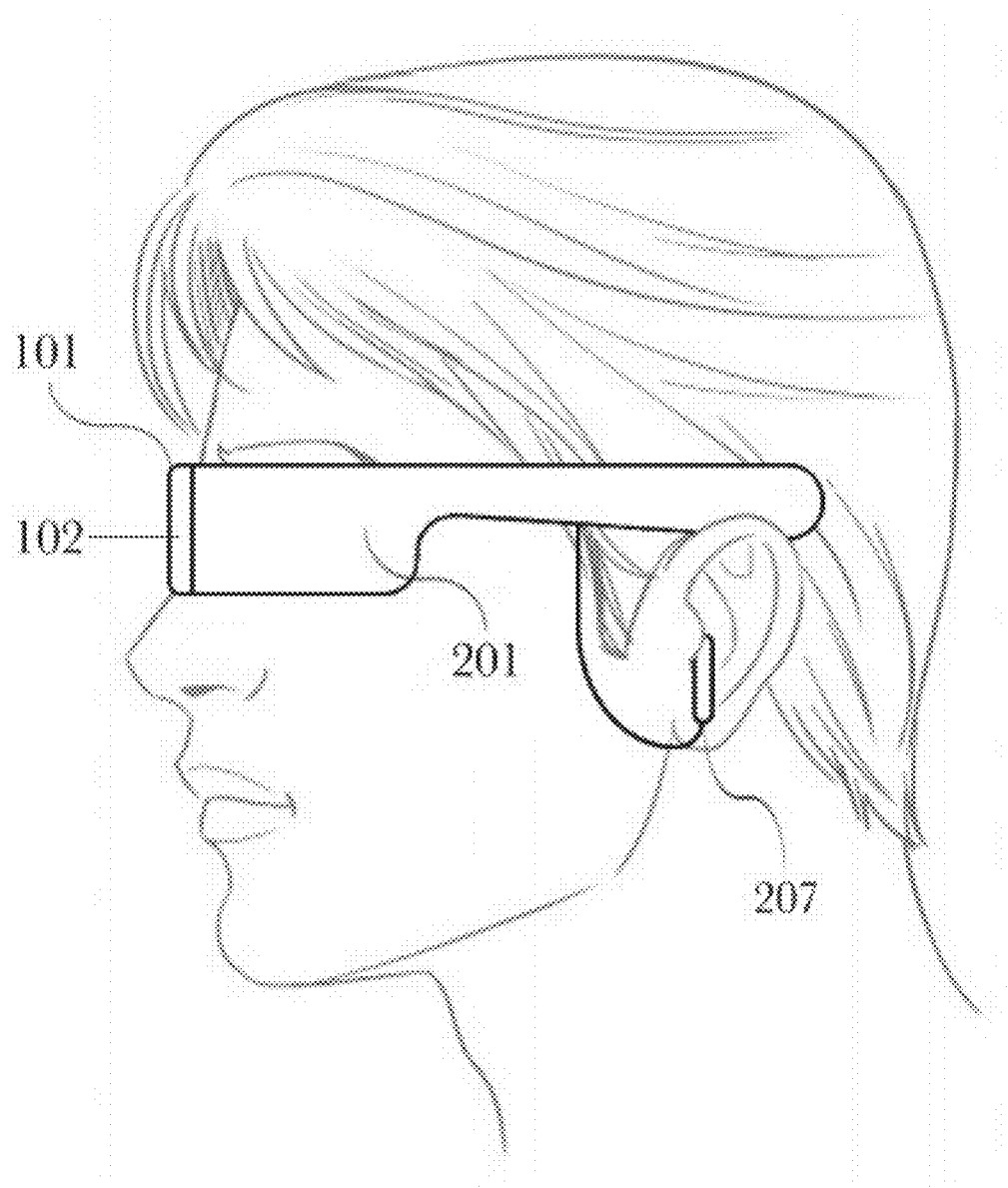
FIG. 11 illustrates a left view of an embodiment of a HMD being worn by the user.

FIG. 11 illustrates an embodiment of device 101 worn by a user whereby we can see the front portion 102, the left portion 201 and the left earphone 207.

Figure 12A:
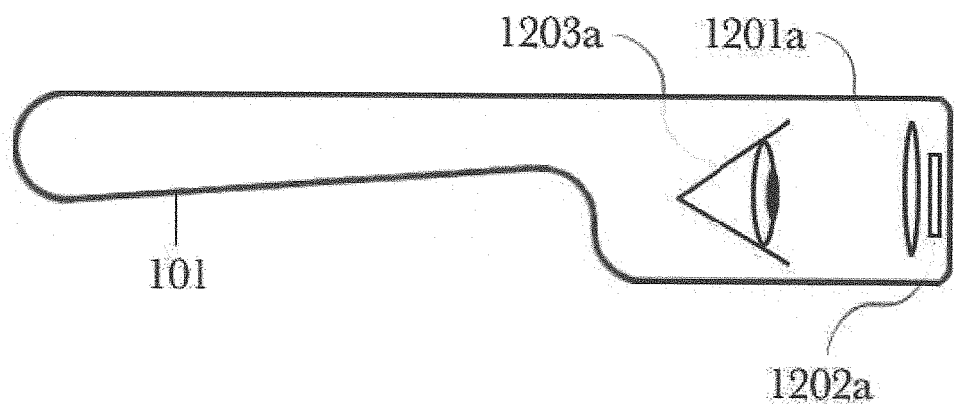
FIG. 12A illustrates a right view of an embodiment of a HMD including an optical element for visually transmitting image data from a display to an eye of the user.
Figure 12B:
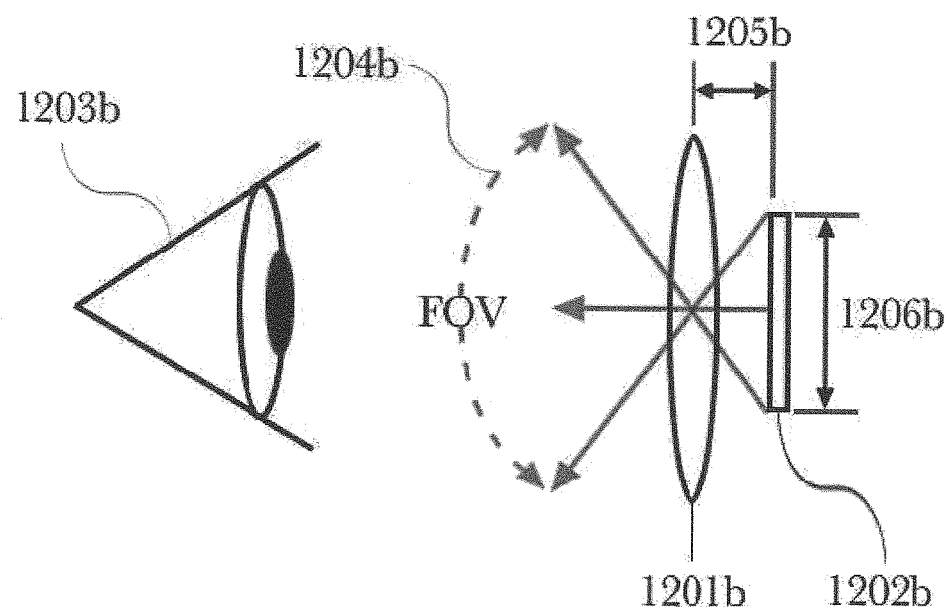
FIG. 12B illustrates an example of an optical element for visually transmitting image data from a display to an eye of the user.

FIG. 12A illustrates an exemplary a simple magnifier optic design, whereby a single positive lens 1201a is used to visually transmit the image data from a display 1202a to the eye of a user 1203a. Unlike more complicated optical designs, such as a compound microscope approach with two or more optics, a simple magnifier optic design advantageously allows for reduced cost of construction, reduced device weight and simplicity of construction. FIG. 12B provides a more detailed explanation of how a single collimating lens 1201b visually transmits the image from a display 1202b to the eye of the user 1203b. The distance 1205b between the surface of the display 1202b and the lens 1201b is generally one focal length to permit the light rays coming from any location on the display surface 1202b to be captured by the lens 1201b and bent so that the light rays are parallel to one another upon exiting the lens 1201b. Generally speaking, one of the primary characteristics of a good HMD is a large Field of View (FOV). The FOV is the angle subtended by the image as seen by the user. The light rays, one from the top and bottom of the display 1202b, going through the center of the collimating lens intersect at an angle that corresponds to the FOV 1204b. The FOV 1204b can be increased by either decreasing the distance 1205b (the focal length) between the lens 1201b and the display surface 1202b or by increasing the size of the display 1206b.

Media files are digital containers for holding one or more kinds of media content, such as video, images, audio, text, 3D objects and metadata. Media files are generally composed of one or more layers or "tracks", with each track dedicated to a specific media element. Media files are digital containers for holding one or more kinds of media content, such as video, images, audio, text, 3D objects and metadata. Media files are generally composed of one or more layers or "tracks", with each track dedicated to a specific media element.

Figure 13:
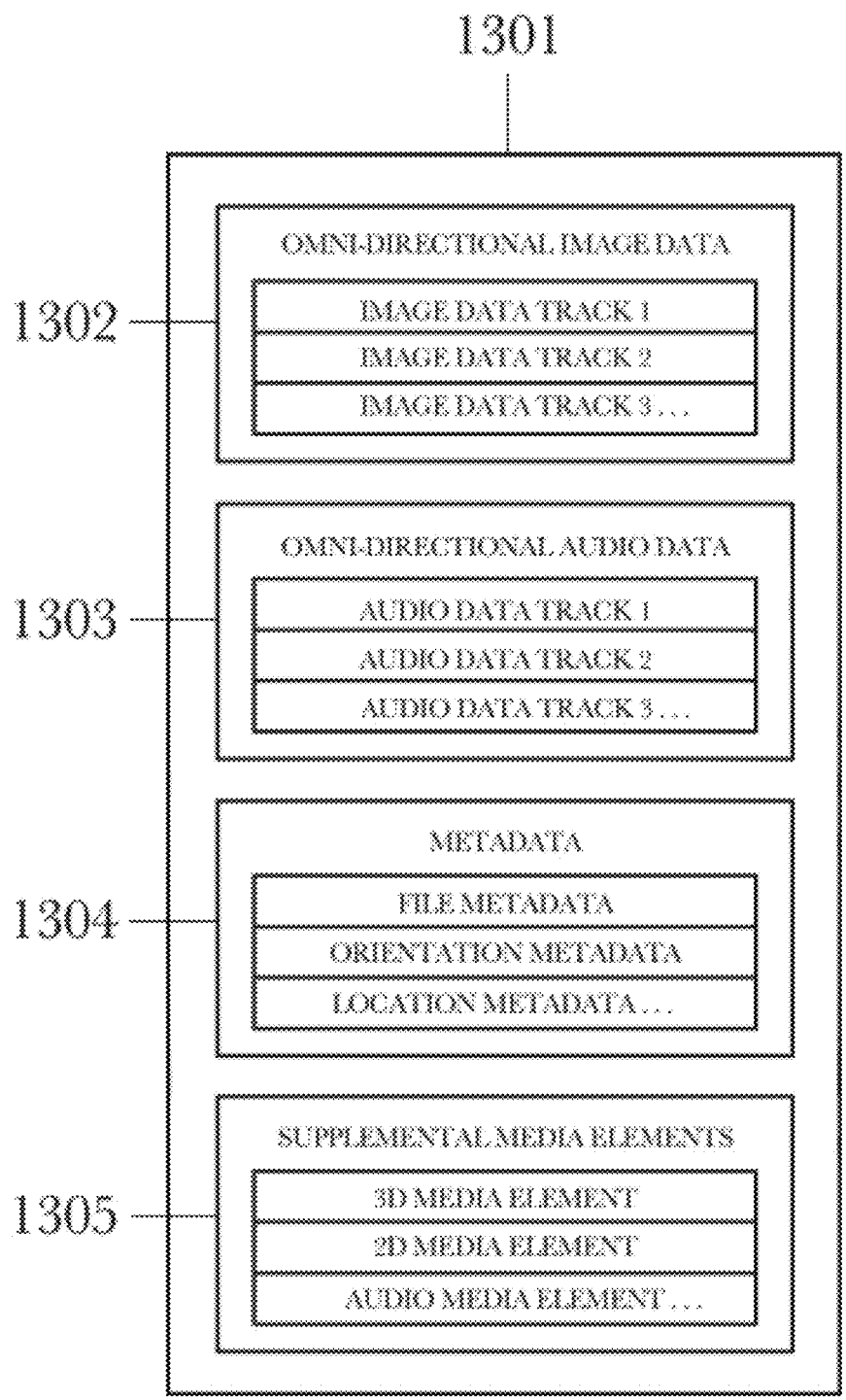
FIG. 13 illustrates an example of a media file including omnidirectional image data, omnidirectional audio data, metadata and supplemental media elements.

FIG. 13 illustrates an exemplary media file container 1301. The media file 1301 may be a standard format, such as an mp4 container, or a proprietary format. As shown in FIG. 13, exemplary media file 1301 includes omnidirectional image data 1302, omnidirectional audio data 1303, metadata 1304 and supplemental media elements 1305. The number of tracks containing omnidirectional image data, omnidirectional audio data, metadata and supplemental media elements may also vary depending on the device used to create the media file.

Figure 14A:
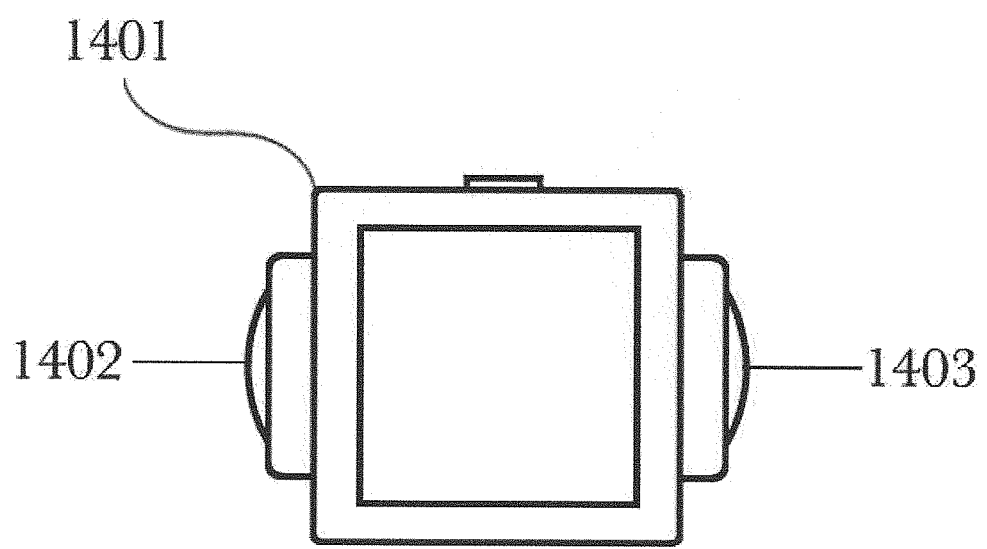
FIG. 14A illustrates a front view of an exemplary omnidirectional camera with two cameras for recording omnidirectional image data.

For example, FIG. 14A illustrates an exemplary omnidirectional camera 1401 for creating the media file. One example of an omnidirectional camera for creating such a media file is described in U.S. Patent Application Publication No. 2012/0206565, which is hereby incorporated by reference. Camera 1401 contains two cameras, 1402 and 1403, each coupled with wide angle lenses for capturing omnidirectional image data. In this example, each camera captures a hemispherical image with at least a 180° degree field of view, such that the combined image data from both cameras will collectively represent a complete or "spherical" field of view containing 360° horizontal by 180° vertical field of view. The format of the omnidirectional image data created by the camera 1401 will depend entirely on the software (firmware) used by the camera. For example, the software may combine the image data produced by camera 1402 and 1403 into a single image 1404, as demonstrated in FIG. 14B, whereby the image data produced by each camera is set edge-to-edge. In this case the omnidirectional image data would consist of a single track in the media file. The camera may also utilize another method whereby the image data produced by cameras 1402 and 1403 would be incorporated into the media file as separate tracks. Image 1405 and 1406 of FIG. 14B represent image data produced by cameras 1402 and 1403 respectively. In this case, the omnidirectional image data of 1405 and 1406 would each have their own omnidirectional image data track in the media file. This means, in this case, the media file would contain two (2) media tracks of omnidirectional image data. The firmware of an omnidirectional camera may also utilize specialized software processes to combine the image data from each camera into a single image.

Figure 15:
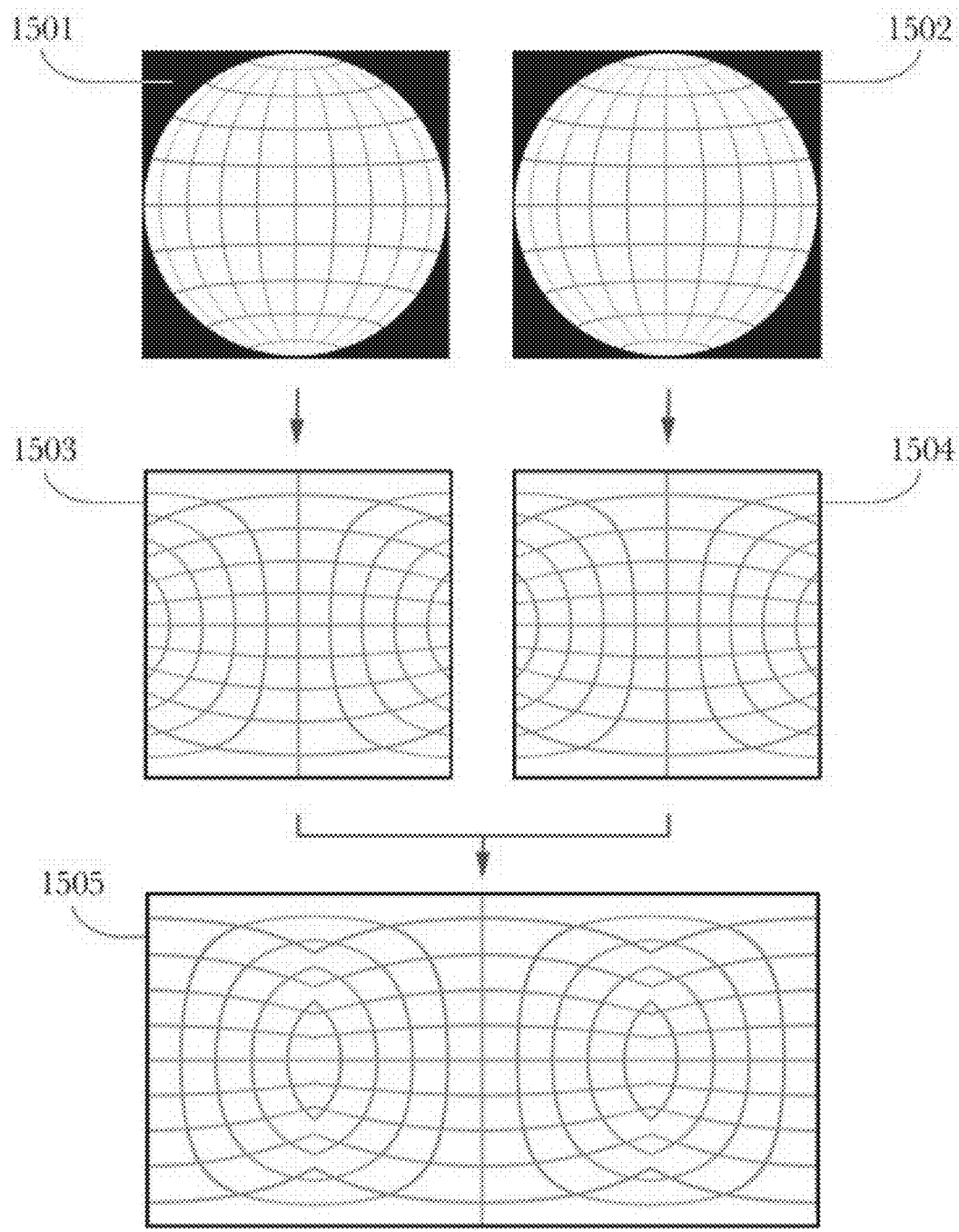
FIG. 15 illustrates an exemplary process for creating a single image containing omnidirectional image data by transforming and combining the image data derived from multiple cameras.
Figure 16:
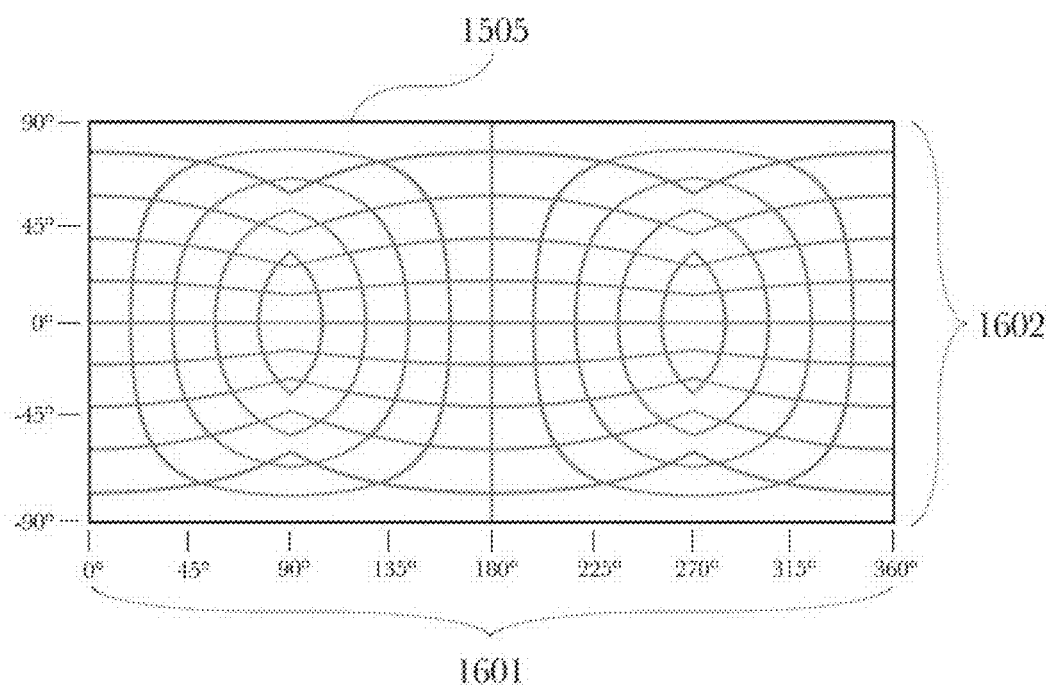
FIG. 16 illustrates an exemplary single image containing omnidirectional image data with a complete 360° degree horizontal field of view and a 180° degree field of view, otherwise referred to as a 'equirectangular' or 'spherical' image.

FIG. 15 illustrates an example of such a process whereby the image data produced by two cameras is transformed and combined to form a single, seamless image. The process illustrated in FIG. 15 is based on image data produced by the two-lens camera 1401 described in FIG. 14A. FIG. 15 shows image 1501 produced by camera 1402 and image 1502 produced by camera 1403. 1503 and 1504 illustrate the results of 1501 and 1502 after they have been visually modified via image transformations, vignette removal processes and other processes. Image 1505 shows the single omnidirectional image produced by combining images 1503 and 1504 using various masking and blending techniques. Image 1505 is referred to as an equirectangular or "spherical" image format and can be created from image data derived from two or more cameras. In this case, the media file would require only a single track containing omnidirectional image data. FIG. 16 illustrates the equirectangular image format of 1505 in greater detail. The combined image data of image 1505 collectively represents a complete "spherical" field of view, meaning it contains a complete 360° horizontal field 1601 of view and a 180° vertical field of view 1602. An equirectangular image ideally contains image data captured from every possible viewing angle.

Figure 17A:
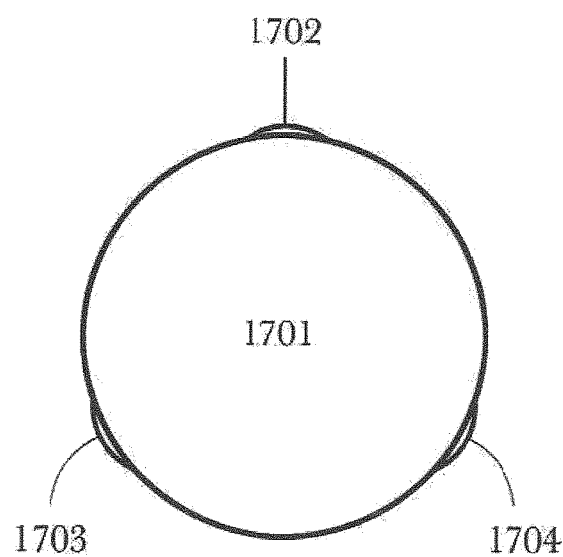
FIGS. 17A and 17B respectively illustrate a front and angled view of an exemplary omnidirectional camera with three cameras for recording omnidirectional image data.
Figure 17B:
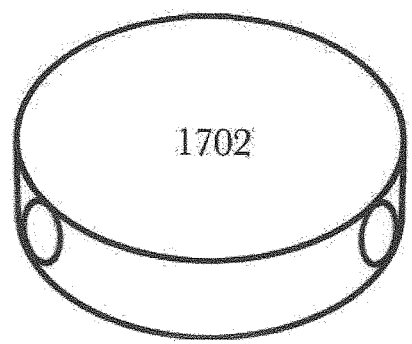

FIG. 17A illustrates a top-down view of an exemplary omnidirectional recording camera device 1701. In this example, the device has three cameras 1702, 1703, and 1704 for capturing omnidirectional image data. Device 1702 in FIG. 17B illustrates the device 1701 seen from an angle.

Figure 18:
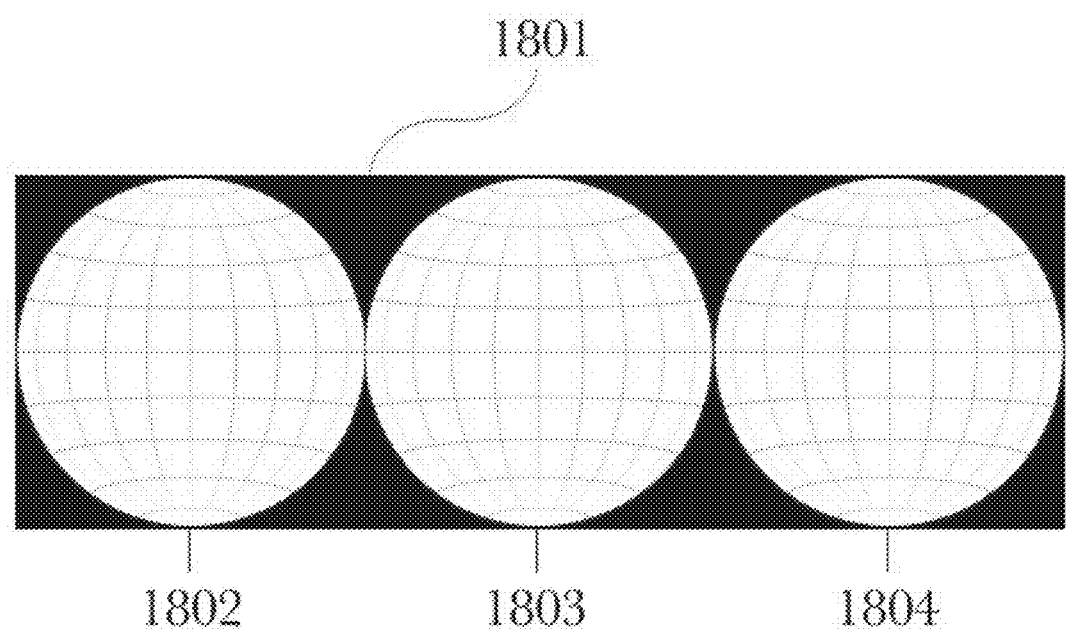
FIG. 18 illustrates exemplary omnidirectional image data comprised of three combined circular images, each derived from three individual cameras.

FIG. 18 illustrates an exemplary process for creating a single image 1801 from circular images from cameras 1702, 1703 and 1704. Element 1802, 1803, and 1804 represent image data from cameras 1702, 1703, and 1704, respectively. Since the images have been combined into a single image 1801, the media file would require only a single track for omnidirectional image data.

Figure 19:
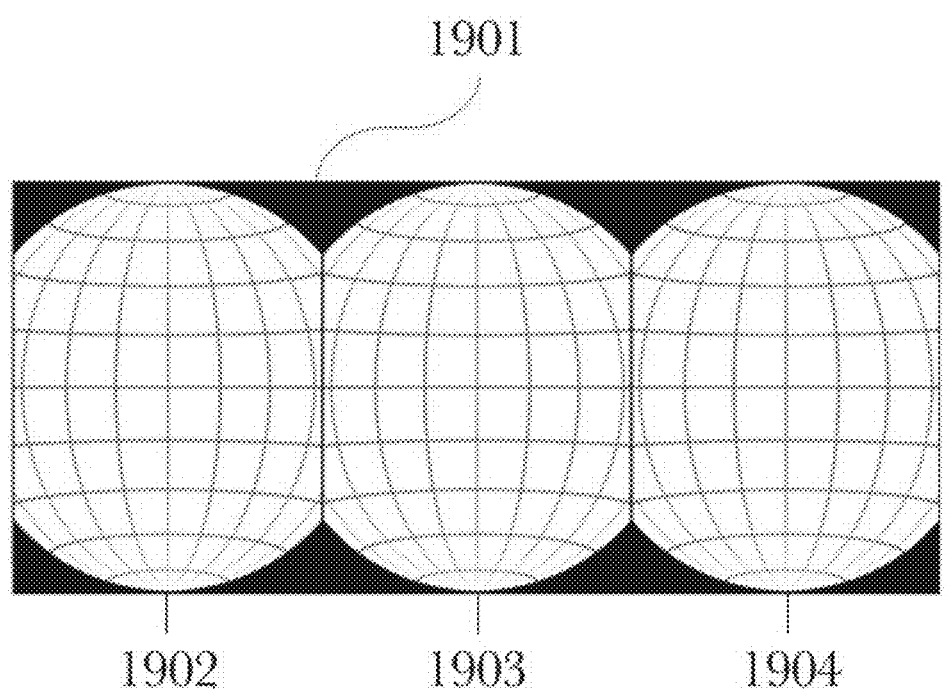
FIG. 19 illustrates exemplary omnidirectional image data comprised of three combined cropped images, each derived from three individual cameras.

FIG. 19 illustrates exemplary image data captured by device 1701. In this example, cameras 1702, 1703 and 1704 have each produced images, which have been combined to create a single image 1901. Elements 1902, 1903, and 1904 represent image data from cameras 1702, 1703, and 1704, respectively. Since the images have been combined into a single image, the media file would require only a single track for omnidirectional image data.

Figure 20:
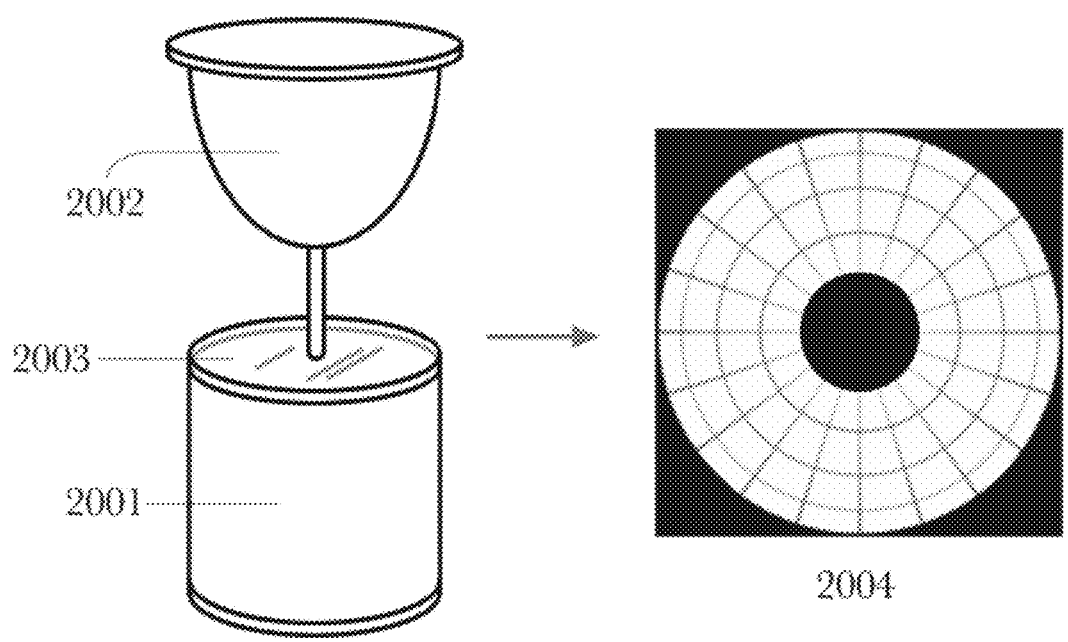
FIG. 20 illustrates an exemplary mirrored camera attachment for creating omnidirectional image data.

FIG. 20 illustrates an exemplary mirrored lens adaptor which may be used to capture omnidirectional image data. In this case, the adaptor base 2001 contains a mirror 2002 that is attached to the base via a transparent disk 2003. A camera, such as a photo or video camera (not shown), is attached underneath the adaptor base to view the mirror through the transparent disk. The resulting image data is generally that of a circle or "donut" shape, as illustrated in 2004. Due to its structure, however, the mirrored lens adaptor cannot record a complete 180° vertical field of view. In this case, it is only capable of recording non-spherical or "cylindrical" omnidirectional image data.

In some embodiments, the media files to be played by device 101 are stored in an internal memory of the device 101 or on a card-based storage device that is inserted into the device 101 via an external card slot, or other appropriate storage devices that are accessible by the computer processor. One example of a card-based storage device is an SD Card, which is capable of holding large amounts of data at a time. The media file(s) may also be transferred to the device 101 through either wired or wireless means, or both. For example, the device 101 may receive a streamed media file from a remote web server or other computing device via a wired or wireless connection. The streamed media file may contain pre-recorded image data or be data being broadcast from a live event. Computing devices may be a portable computing device, such as a tablet, phone or laptop, an omnidirectional camera device or another HMD. In some embodiments, the device is capable of receiving, sending, and/or sharing media files with remote devices and servers.

According to aspects of the invention, the device 101 executes computer instructions to, among other things, display a media file containing omnidirectional image data to the user. In some embodiments, these computer instructions comprise an omnidirectional media viewer application ("media viewer"). As described below, FIG. 51 provides exemplary software source code for a media viewer. This source code is shown only to demonstrate the fundamental logic of a media viewer and does not limit the scope of the invention. The programming language used to write the media viewer will depend on the operating system used by the device 101 and other operational characteristics of the device 101.

In an embodiment, the media viewer application first creates a three-dimensional, virtual environment 5801. An example software process of creating a virtual environment is shown at lines 9-10 of FIG. 51. The media viewer then receives a media file via a source 5802. The media file may be received from a number of sources including, but not limited to, an internal storage memory of the device 101, a card-based storage device, a remote web server, a computing device, an omnidirectional camera or another HMD. An example software process of receiving a media file is shown at lines 19-23 of FIG. 51. Within the virtual environment

5801, the media viewer creates a three-dimensional object 5803 (also shown at 2101 in FIG. 21), called a "render object", and applies the image/video data of a media file (also shown at 1505 in FIG. 21) to one or more of the render object's surfaces 58. The shape and size of the render object 5803 may vary, depending on the format of the image data within the media file. The description of the omnidirectional image data in the media file may be derived from metadata information also contained in the media file 5803. The render object 5803 may, for example, be a cube ("render cube") or a sphere ("render sphere") depending on what is most suitable for displaying the image data. An example software process of creating a render object and adding it to the virtual environment is shown at lines 25-33 of FIG. 51. In this case, the format of the omnidirectional image data is equirectangular 1505 and therefor the software creates a render sphere as a sphere is best suited for this format. The media viewer then creates a virtual "render camera" (shown at 2102 in FIG. 21) and places it at the center of the render object 5805. An example software process of creating a render camera and adding it to a render object is shown in lines 11-16 of FIG. 51. The render camera provides a "user view" inside the render object, seeing and displaying a select portion of one or more internal surfaces of the render object. As the received media file's image data is rendered on one or more internal surfaces of the render object, the visual information seen by the virtual render camera is displayed on the HMD displays while the audio from the media file is simultaneously played via the speakers. The portion of the image data seen by the render camera is determined by the rotational position of the render camera along its x-axis, y-axis and z-axis and by its field of view or zoom value. The visual and audio data transmitted to the user by the render camera is called the "user view". By changing the field of view and rotating the render camera along its x, y and z-axis, the user view updates in real time, continually updating the visual and audio information displayed to the HMD wearer via the displays and speakers (or microphones).

Figure 59:
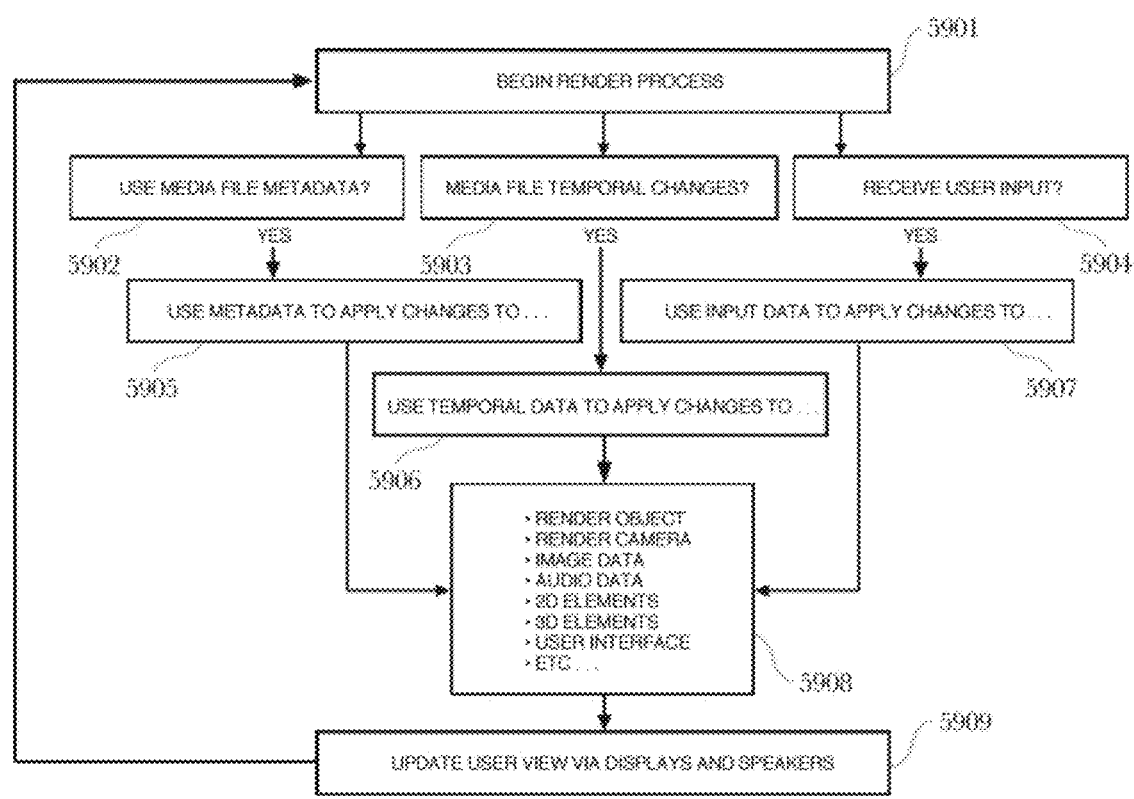
FIG. 59 illustrates an exemplary rendering process for generating image data and audio data and displaying the image data and audio data to a user.

Generally, a media viewer software application runs a continually repeating process, called a render process, to continually update the visual and audio information presented to the user. The purpose of the render process is to continually evaluate the various input data being received by the one or more input sources and update the image and audio data being displayed to the user based on this data. This render process would continually loop multiple times per second to provide a fast response to any input received. An example of a render process is provided in FIG. 59. In this example, the render process loop begins 5901 and first checks whether to utilize any metadata in the media file 5902, whether to make any changes based on temporal changes in the media file 5903 and checks whether the device has received any user based input 5904. Temporal changes are relevant only if the media file contains omnidirectional video as video files must be updated to be refresh their visual content. User input 5904 would include data received from the orientation information acquisition device, e.g., a Head Tracker, by input received by the input controls of the device 101, by voice commands received via the microphone 104 or by hand gestures received by the camera 103. If the value of 5902, 5903 or 5904 is true, the media viewer would make appropriate changes 5908, including, but not limited to, changes to the render object, render camera, image (or video) data of the media file, audio data of the media file, 2D and 3D elements of the media file. The media viewer would then update the interface, user view and any other relevant visual or audio element via the one or more displays [203 and 204 of FIG. 2] and the one or more speakers (earphones) [207 and 208 of FIG. 2] of the device 101. The render process loop would then begin again at 5901.

The media viewer advantageously allows the omnidirectional media file to be presented to a user in such a manner as to give the user a sense that they are inside a virtual environment. The software allows the user to interactively change their viewing angle within the virtual environment at any time using data received from the orientation information acquisition device, e.g., a Head Tracker or by input received by the input controls of the device 101, by voice commands received via the microphone 104 or by hand gestures received by the camera 103. By changing which portion of the omnidirectional image is seen, the user is given the sensation that they are within a live or pre-recorded event. The ability to change their angle of view provides a sense of freedom and control, just as one would feel would in real life.

In another embodiment, the device 101 includes at least one microphone to allow voice-recognition capabilities. For example, software executing on the processor of the device 101 recognizes voice commands (in multiple languages) and perform actions based on these commands. Voice commands may perform any device function, such as navigating a user interface, starting and stopping a recording sequence, controlling the media viewer, loading new media files, connecting to a remote web server or turning the device 101 off. To avoid unwanted voice-based actions from occurring, the software may be designed to listen for a pre-defined keyword, such as "LISTEN", before performing any voice-based actions. The user interface may give a visual confirmation, such as displaying an icon, to indicate that the invention is now listening for a voice command. To cancel the voice-recognition feature, the user may simply say "CANCEL". For example, to display a preference panel in the user interface, the user may say "LISTEN . . . open the preference panel" or, to search for a specific media file, they may say "LISTEN . . . search for Rock Climbing in Joshua Tree". Voice commands may also be used to control the media viewer. Speaking "LISTEN . . . pan slowly right 45 degrees", for example, instructs the media viewer to change its horizontal view (pan) by 45 degrees. Other voice commands may be used to control the media file being played in the media viewer. If the media file contains video, the user may say "LISTEN . . . pause" to pause the video or "LISTEN . . . play backward at 50 percent" to play the video in reverse in slow motion. In another example, speaking "LISTEN . . . load a media file . . . " displays a list or visual menu in the user interface containing all of the current media files on the device 101 and allows the user to select a new one (using their voice or another input method).

According to aspects of the invention, the media viewer may support a single, proprietary file format while, in other embodiments, the media viewer would support multiple media file formats. Since the format and content of media files may vary depending on the type of device (or devices) used to create the media file, the device 101 may advantageously support multiple file types. In some embodiments, the media viewer may require that media files contain at least one element, such as a metadata track, to ensure compatibility with the device 101. If the media viewer attempts to open an unrecognized media file format, the media viewer may attempt to locate a metadata track within the media file that instructs the device 101 on how to properly view the media file. The metadata track may, for example, provide information about the image data so that the media viewer can properly create a render object suitable for applying the image data as a texture to one or more of the object's surfaces. Optionally, the device 101 may support additional formats through firmware updates.

In some embodiments, the media viewer may simultaneously combine data from multiple media files and render the combined data on one or more surfaces of the render object. Each media file could reside in the same source location or in different source locations. For example, one media file may reside on the internal memory of the invention while a second media file, augmenting the first, may stream from a server. For example, the media viewer may load a media file containing omnidirectional video (such as a walkthrough of a house) from the internal memory of the device 101 and receive a second media file containing computer generated 3D imagery of furniture from a streaming server. In this example, the media viewer combines the omnidirectional video data with the computer generated 3D furniture and simultaneously renders both on one or more surfaces of the render object. The media viewer may optionally provide the capability of changing one or more characteristics of the 3D furniture elements, such as their shape and color. These changes could be made via a user interface controlled by the input controls.

In some embodiments, the device 101 additionally comprises an integrated Global Positioning System (GPS) module (not illustrated). The GPS module would allow the device 101 to be location-aware and have the ability to conduct actions based on data received from the GPS module. GPS data would include data such as the invention's current, and prior latitude, longitude and bearing information. The media viewer may, for example, play a specific media file or make adjustment to the render camera or render object based on the invention's current global position, bearing or both. If the invention uses a transparent or semitransparent front [102], the media viewer may also overlay semi-transparent omnidirectional image data on the displays. This would allow the overlaid omnidirectional image data to augment the external world seen through the front of the device 101, thereby simultaneously merging a virtual world of the media file with the real world.

Figure 21:
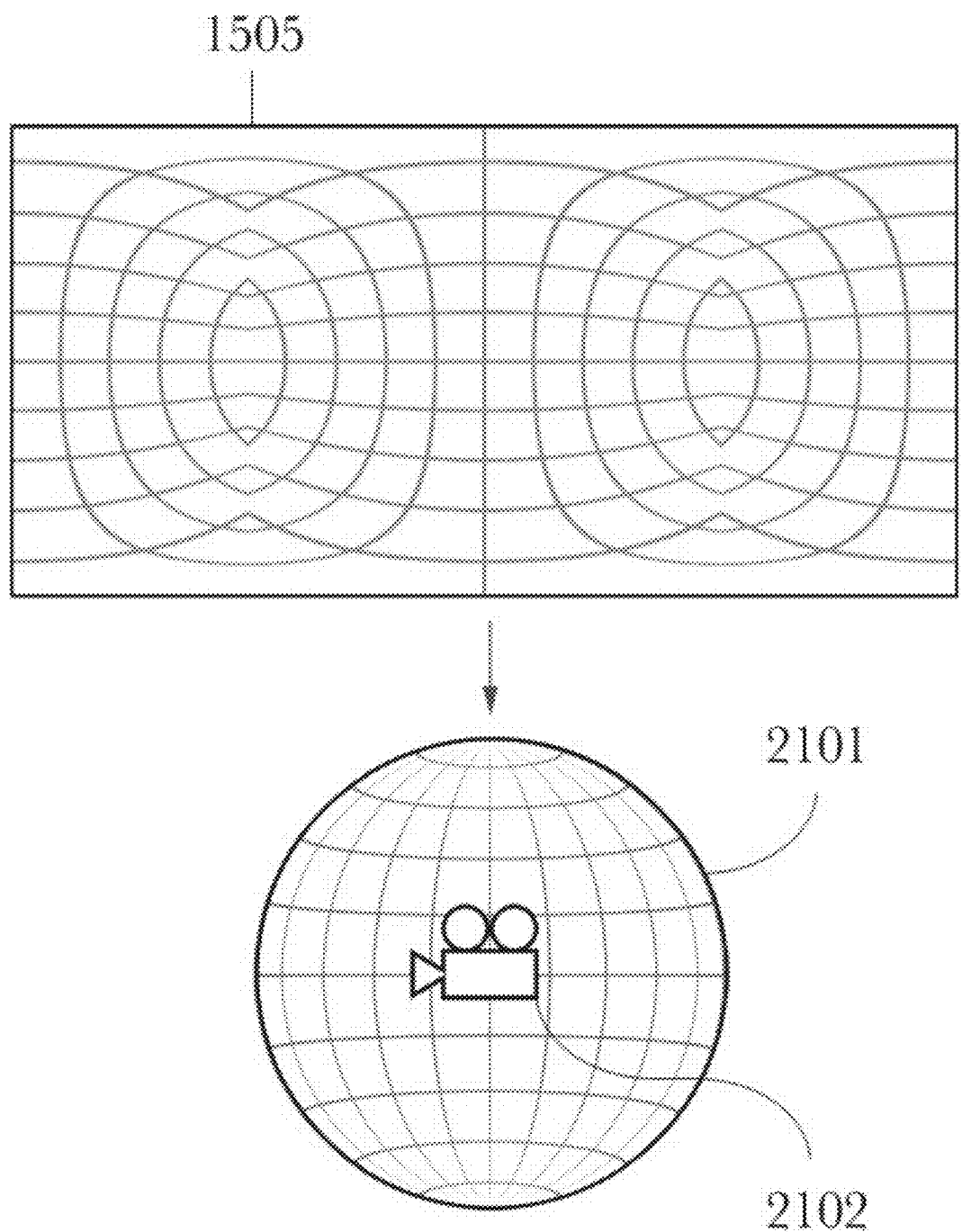
FIG. 21 illustrates an exemplary spherical render object with omnidirectional image data applied as a texture to its interior surface and a render camera placed at its center.

FIG. 21 illustrates the process whereby the omnidirectional image data of a media file 1505 is applied to the surface of a render object 2101, here a sphere, and where a render camera 2102 has been created and placed at the center of the render object 2101.

Figure 22:
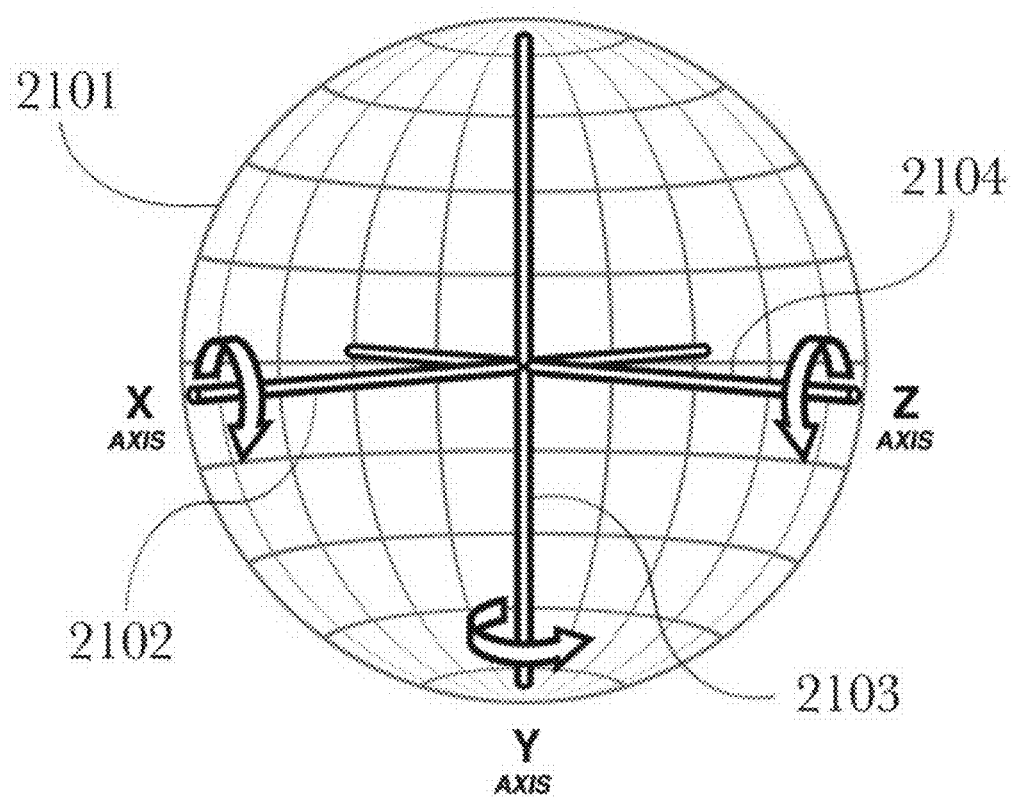
FIG. 22 illustrates how an exemplary render object can be independently rotated about its x-axis, y-axis and z-axis.

FIG. 22 shows how the render object 2101 may be independently rotated about its x-axis 2102, y-axis 2103 and z-axis 2104. The purpose of rotating the render object may vary, but one purpose may be to visually correct image data that was originally recorded from a camera that was not level or stable when being operated. In this case, the media file would contain an additional metadata track, called an orientation metadata track, that would be used to adjust the rotational values of the render object to visually stabilize the original, unstable image data. The render object would be able to rotate independently of the render camera.

Figure 23:
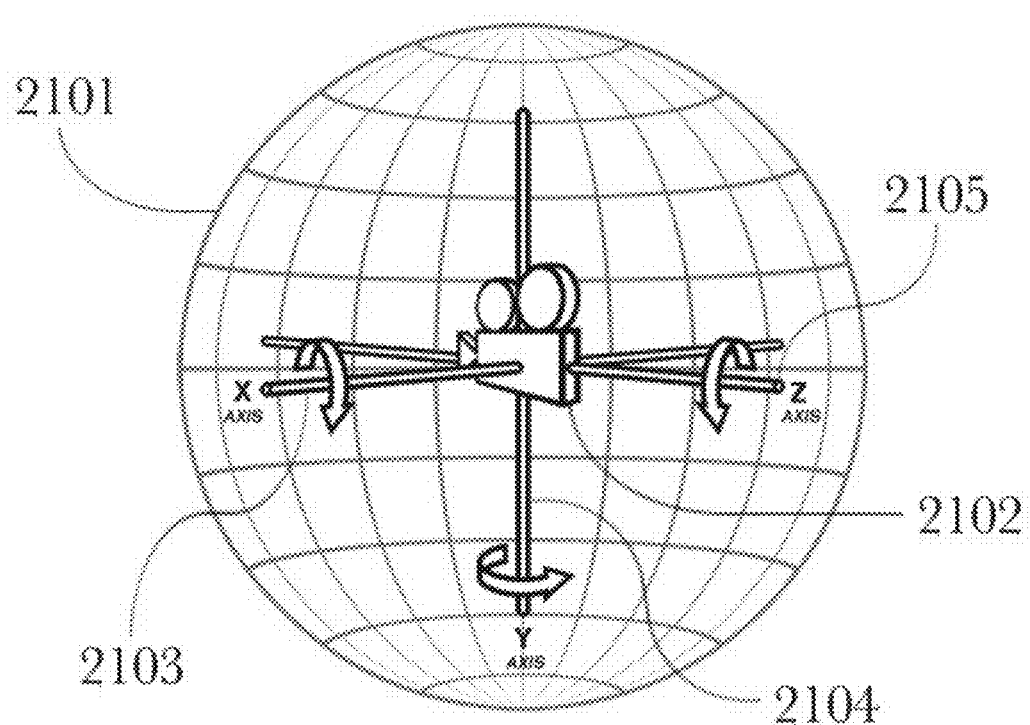
FIG. 23 illustrates how an exemplary render camera can be independently rotated about its x-axis, y-axis and z-axis.

FIG. 23 shows the render camera 2102 being independently rotated about its x-axis 2103, y-axis 2104 and z-axis 2105 inside a render object 2101. The render camera may be controlled in a number of ways, including but not limited to, data from the orientation information acquisition device (Head Tracker), by input received by one or more input controls of the invention, by voice commands received via the microphone 104 or by hand gestures received via the camera 103. By using the orientation information acquisition device (Head Tracker) of the HMD, the user may simultaneously control the render camera directly using their natural head movements, such as looking up, down, left and right. This is accomplished by utilizing values provided by the orientation information acquisition device, such as an accelerometer and gyroscope. As the user rotates their head along the x, y and/or z-axis, the media viewer simultaneously changes the rotation of the render camera along its corresponding x, y and z-axis accordingly. FIG. 52 shows an example software process of using data acquired from an orientation information acquisition device, in this case an accelerometer and gyroscope, to simultaneously change the rotation of the render camera along its corresponding x, y and z-axis. As the render camera changes its rotational position, the updated visual and audio information (user view) is presented to the wearer via the devices displays and speakers. As the user moves their head, the orientation information acquisition device acquires the data produced by the head movements and utilizes the data to simultaneously control the virtual render camera. As the render camera properties are changed, the updated user view is updated in the displays [203 and 204 of FIG. 2] of the device 101.

Figure 24A:
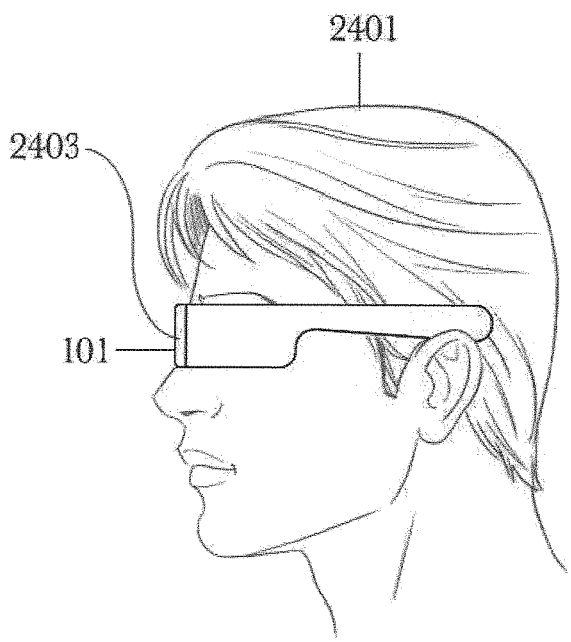
FIGS. 24A and 24B respectively illustrate a left view of an embodiment of a HMD and how the x-axis rotation of the render camera is synchronized to the x-axis rotation of the HMD.
Figure 24B:
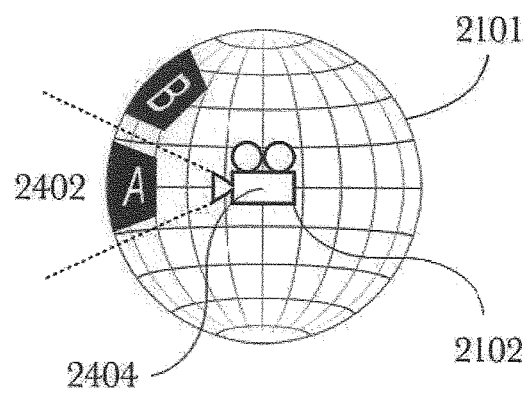
Figure 25:
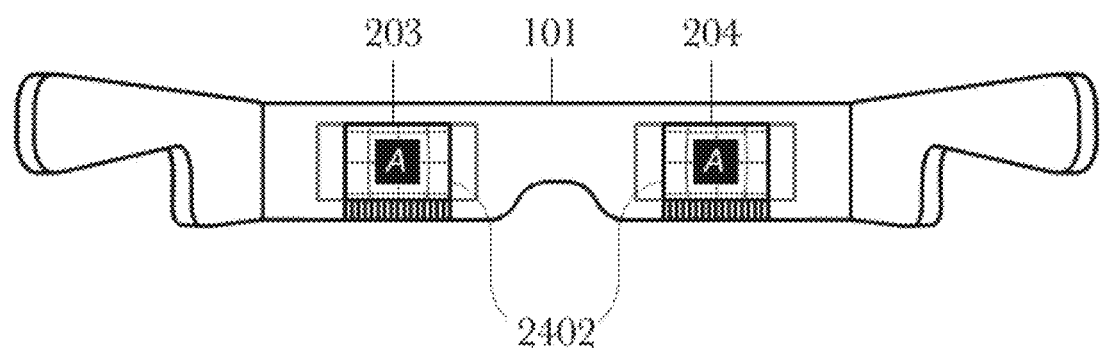
FIG. 25 illustrates an exemplary user view of the render camera of FIG. 24 being displayed on each of the displays of the HMD.

FIG. 24A illustrates a side view of a user 2401 wearing the device 101. Element 2102 shows the render camera inside the render object 2101. Element 2402 represents the user view as seen by the render camera. In this example, the x-axis rotation of the render camera 2404 is synchronized to the x-axis rotation of the device 2403, as illustrated in FIG. 24B via the orientation information acquisition device (Head Tracker)(not illustrated). FIG. 25 illustrates the back of an embodiment of the device 101 showing the user view 2402 of the render camera 2102 of FIG. 24 being presented in displays 203 and 204.

Figures 26A, 26B:
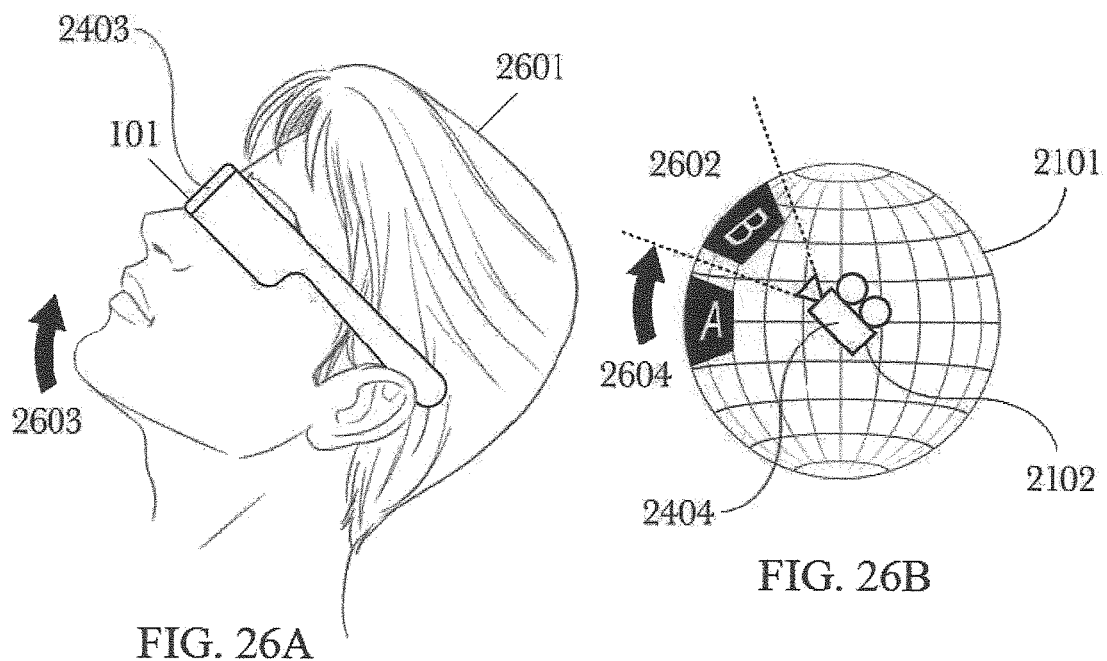
FIGS. 26A and 26B respectively illustrate a left view of an embodiment of a HMD and how changes to the x-axis rotation of the HMD have simultaneously changed the x-axis rotation of the render camera.

FIG. 26A illustrates a side view of a user 2601 wearing the device 101. In this illustration, the user has tilted their head upwards at an angle 2603 from its original position in FIG. 24A, thus changing the x-axis rotation of the invention. In FIG. 26B, element 2102 shows the render camera inside the render object 2101. The x-axis 2404 rotation angle 2604 of the render camera 2102 has been simultaneously changed to match the x-axis 2403 rotation of the invention (and user's head). The render camera 2102 was able to accomplish this simultaneous change by using data provided by the orientation information acquisition device (Head Tracker). Element 2602 represents the updated user view as seen by the render camera 2102.

Figure 27:
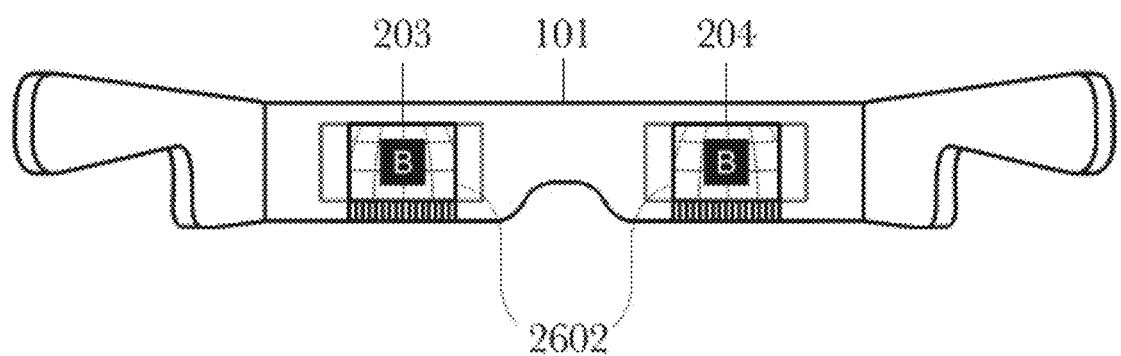
FIG. 27 illustrates an exemplary changed user view of the render camera of FIG. 26 being displayed on each of the displays of the HMD after the x-axis rotation of the HMD and render camera have been simultaneously changed.

FIG. 27 illustrates the back of an embodiment of the device 101 showing the updated user view 2602 of the render camera 2102 of FIG. 26 being presented in displays 203 and 204. In this illustration, we see that the user view has changed based on the simultaneous changes to the x-axis rotation of both the invention 101 and the render camera 2102.

Figures 28A, 28B:
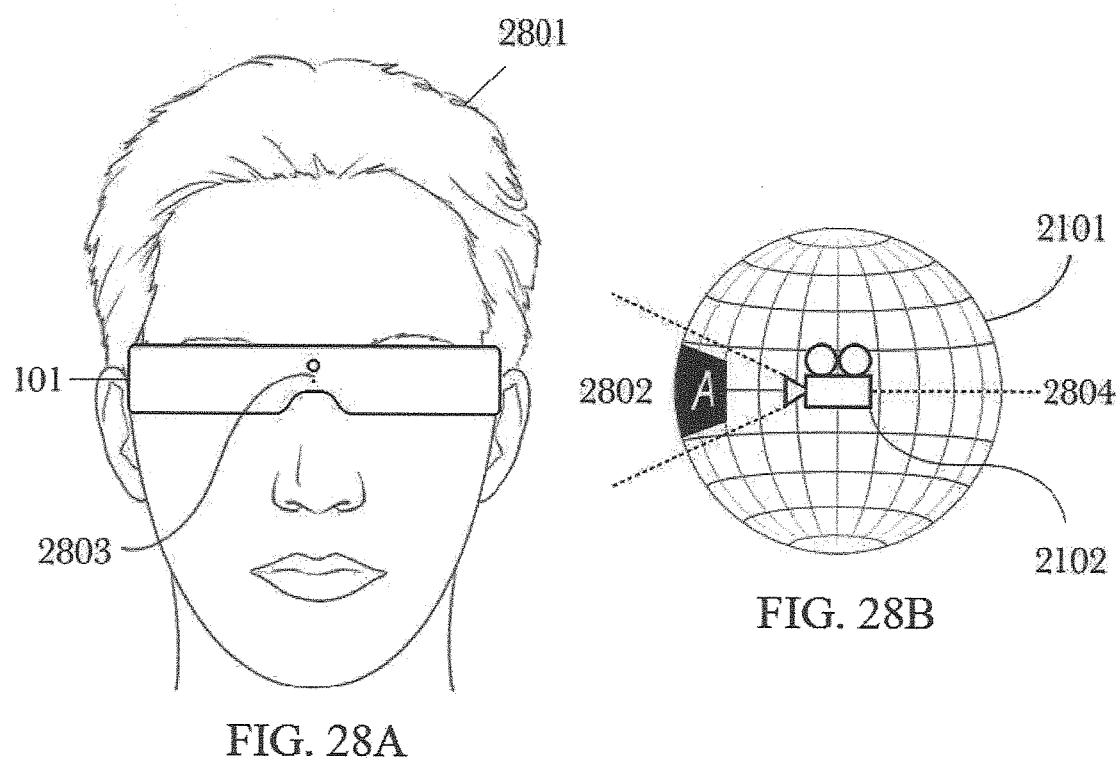
FIGS. 28A and 28B respectively illustrate a front view of an embodiment of a HMD and how the z-axis rotation of the render camera is synchronized to the z-axis rotation of the HMD
Figure 29:
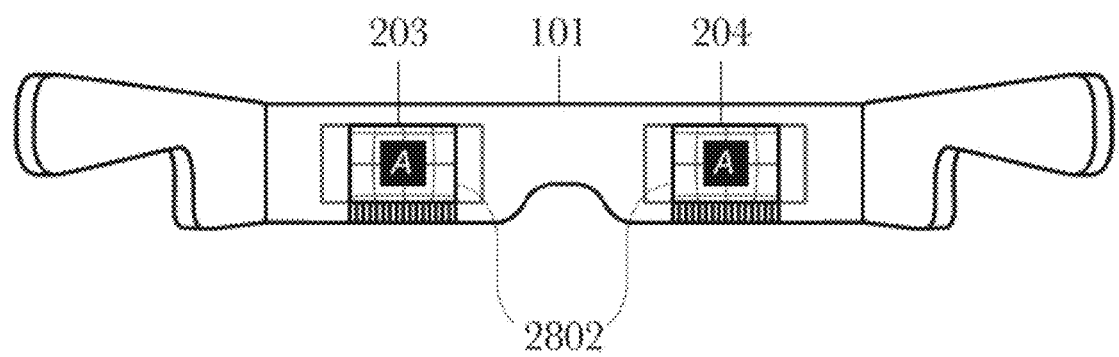
FIG. 29 illustrates an exemplary user view of the render camera of FIG. 28 being displayed on each of the displays of the HMD.

FIG. 28A illustrates a front view of a user 2801 wearing the device 101. In FIG. 28B, element 2102 shows the render camera inside the render object 2101. Element 2802 represents the user view as seen by the render camera. In this example, the z-axis rotation of the render camera 2804 is synchronized to the z-axis rotation of the invention 2803 via the orientation information acquisition device (Head Tracker). FIG. 29 illustrates the back of an embodiment of the device 101 showing the user view 2802 of the render camera 2102 of FIG. 28B being presented in displays 203 and 204.

Figure 30A:
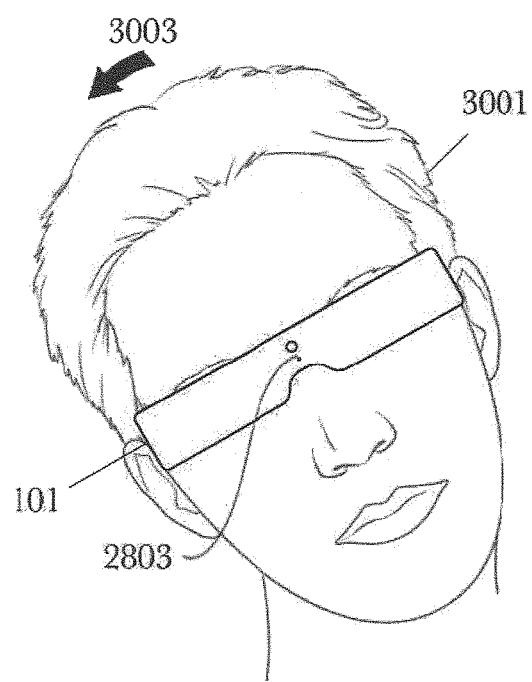
FIGS. 30A and 30B respectively illustrate a front view of an embodiment of a HMD and how changes to the z-axis rotation of the HMD have simultaneously changed the z-axis rotation of the render camera.
Figure 30B:
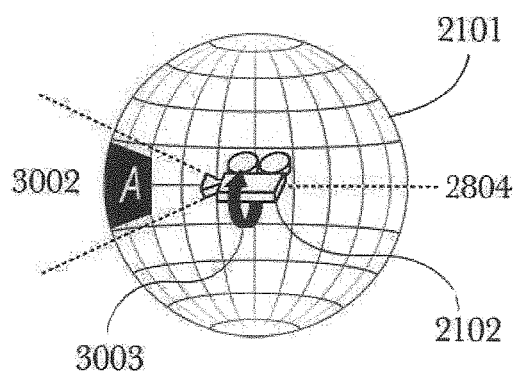

FIG. 30A illustrates a front view of a user 3001 wearing the device 101. In this illustration, the user has tilted their head to their right at an angle 3003 from its original position in FIG. 28A, thus changing the z-axis rotation of the device. In FIG. 30B, element 2102 shows the render camera inside the render object 2101. The z-axis 2804 rotation angle 3003 of the render camera 2102 has been simultaneously changed to match the z-axis 2803 rotation of the invention (and user's head). The render camera was able to accomplish this simultaneous change by using data provided by the orientation information acquisition device (Head Tracker). Element 3002 represents the updated user view as seen by the render camera 2102.

Figure 31:
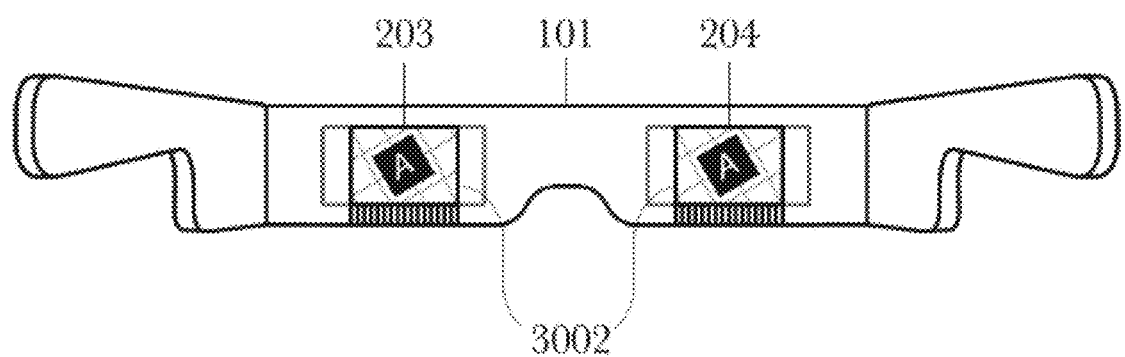
FIG. 31 illustrates an exemplary changed user view of the render camera of FIG. 30 being displayed on each of the displays of the HMD after the z-axis rotation of the HMD and render camera have been simultaneously changed.

FIG. 31 illustrates the back of an embodiment of the device 101 showing the updated user view 3002 of the render camera 2102 of FIG. 30 being presented in displays 203 and 204. In this illustration, we see that user view has changed based on the simultaneous changes to the z-axis rotation of both the invention 101 and the render camera.

Figures 32A, 32B:
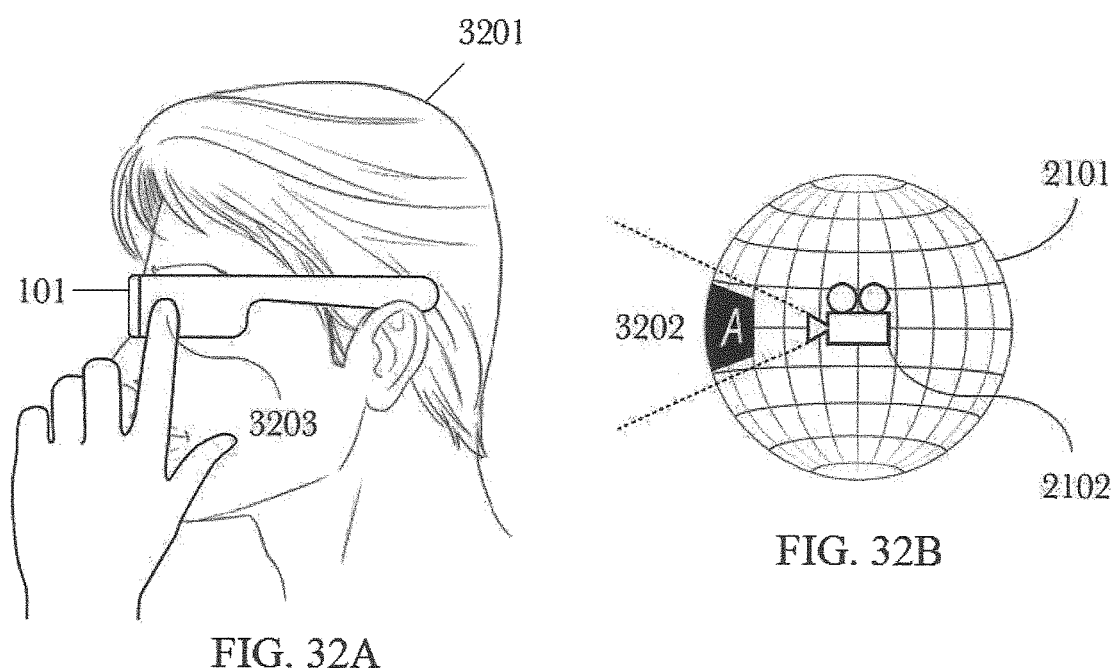
FIGS. 32A and 32B respectively illustrate a left view of an embodiment of a HMD where a user's finger is touching a touch-sensitive surface of the HMD.
Figure 33:
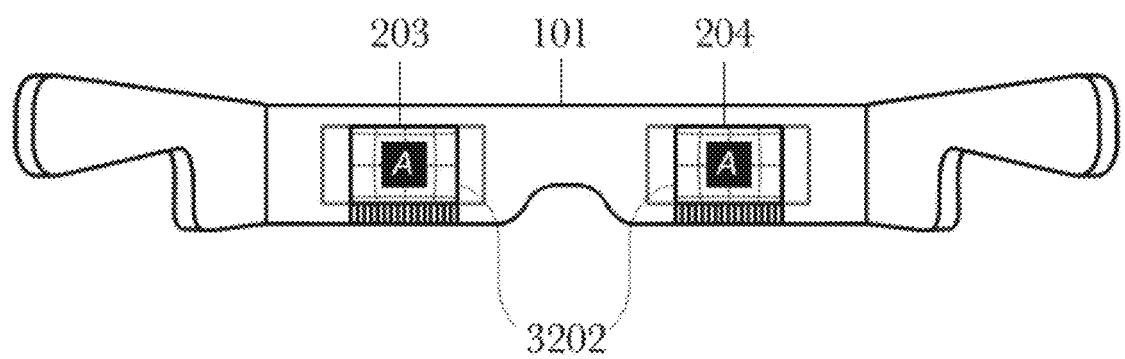
FIG. 33 illustrates an exemplary user view of the render camera of FIG. 32 being displayed on each of the displays of the HMD.

FIG. 32A illustrates the capacity of the invention to use the device 101 input controls, in this case a touch-sensitive surface, to simultaneously control the render camera. FIG. 32A illustrates a side view of a user 3201 wearing the device 101. In FIG. 32B, element 2102 shows the render camera inside the render object 2101. Element 3202 represents the user view as seen by the render camera. The user has touched the device using their finger 3203 to initiate a touch gesture that is recognized by a touch-sensitive surface. In this case, the touch gesture is being used to change the render camera field of view. FIG. 33 illustrates the back of an embodiment of the device 101 showing the user view 3202 of the render camera 2102 of FIG. 32 being presented in displays 203 and 204.

Figures 34A, 34B:
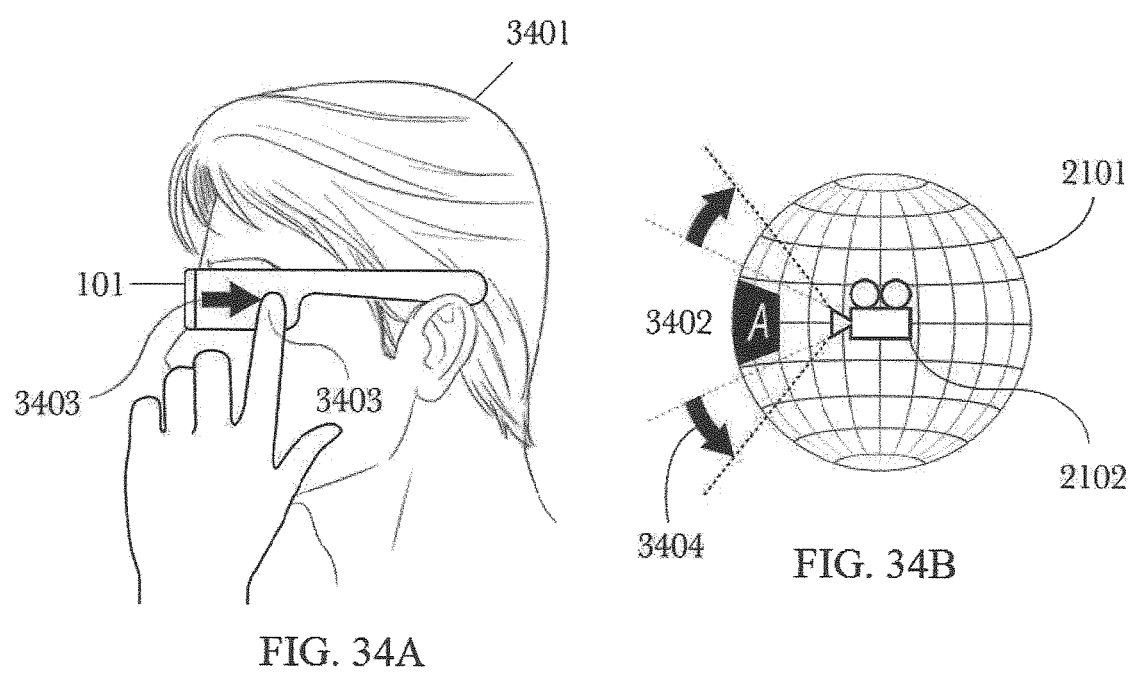
FIGS. 34A and 34B respectively illustrate an example of a user changing the horizontal position of their finger along the touch-sensitive surface of a HMD to simultaneously change the field of view of a render camera.

FIG. 34A illustrates a side view of a user 3401 wearing the device 101. In FIG. 34B, element 2102 shows the render camera inside the render object 2101. The user has slid their finger a specific distance 3403 across the touch-sensitive surface to a new position 3403, thus simultaneously causing the render camera's field of view to change (increase) by a corresponding value 3404. Element 3402 represents the updated user view as seen by the render camera.

Figure 35:
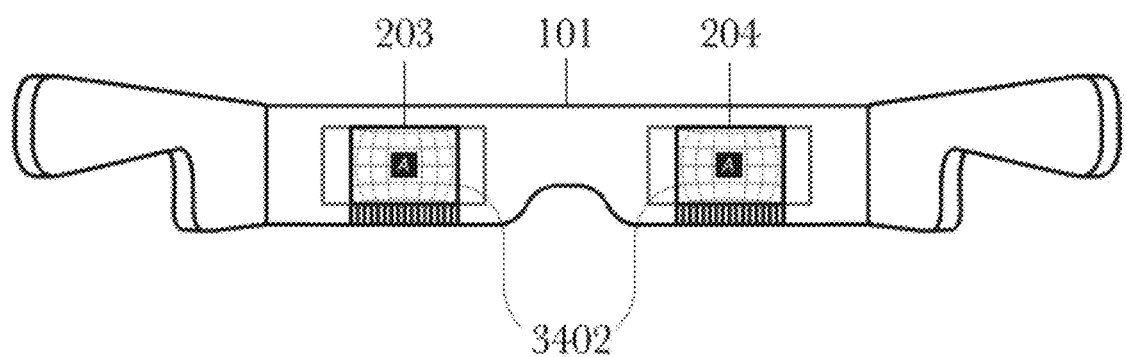
FIG. 35 illustrates an exemplary user view of the render camera of FIG. 34 being displayed on each of the displays of the HMD after the field of view of the render camera has been changed.

FIG. 35 illustrates the back of an embodiment of the device 101 showing the user view 3402 of the render camera 2102 of FIG. 34 being presented in displays 203 and 204. In this illustration, the user view has changed due to the the touch-gesture applied to the surface of the invention which caused the render camera's field of view to increase.

Figure 36A:
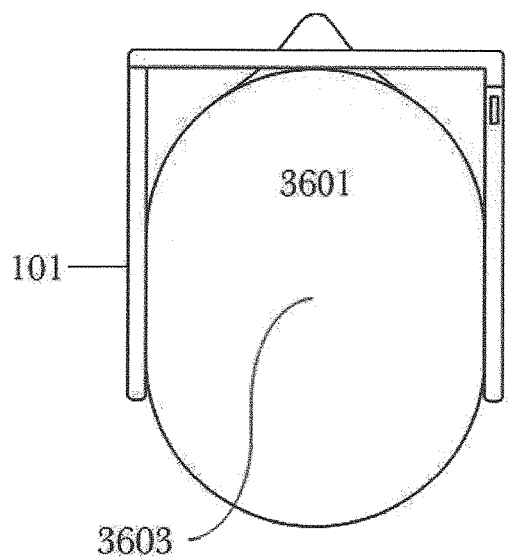
FIGS. 36A and 36B respectively illustrate a left view of an embodiment of a HMD and how the y-axis rotation of the render camera is synchronized to the y-axis rotation of the HMD
Figure 36B:
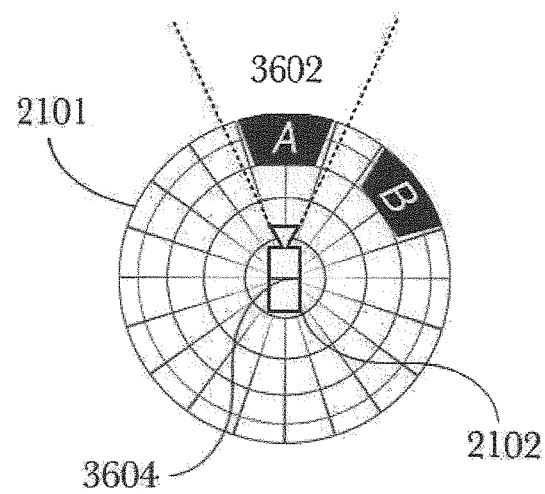
Figure 37:
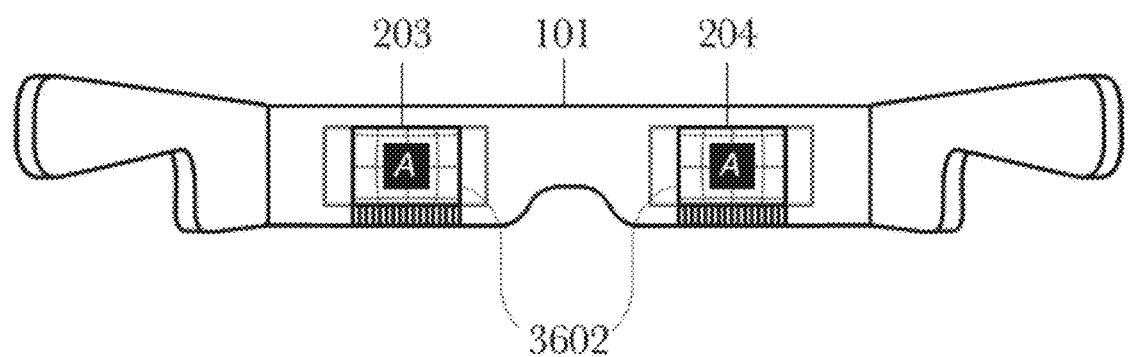
FIG. 37 illustrates an exemplary user view of the render camera of FIG. 36 being displayed on each of the displays of the HMD.

FIG. 36A illustrates a top view of a user 3601 wearing the device 101. In FIG. 36B, element 2102 shows the render camera inside the render object 2101. Element 3602 represents the user view as seen by the render camera. In this example, the y-axis rotation of the render camera 3604 is synchronized to the y-axis rotation of the device 3603 via the orientation information acquisition device (Head Tracker). FIG. 37 illustrates the back of an embodiment of the device 101 showing the user view 3602 of the render camera 2102 of FIG. 36B being presented in displays 203 and 204.

Figures 38A, 38B:
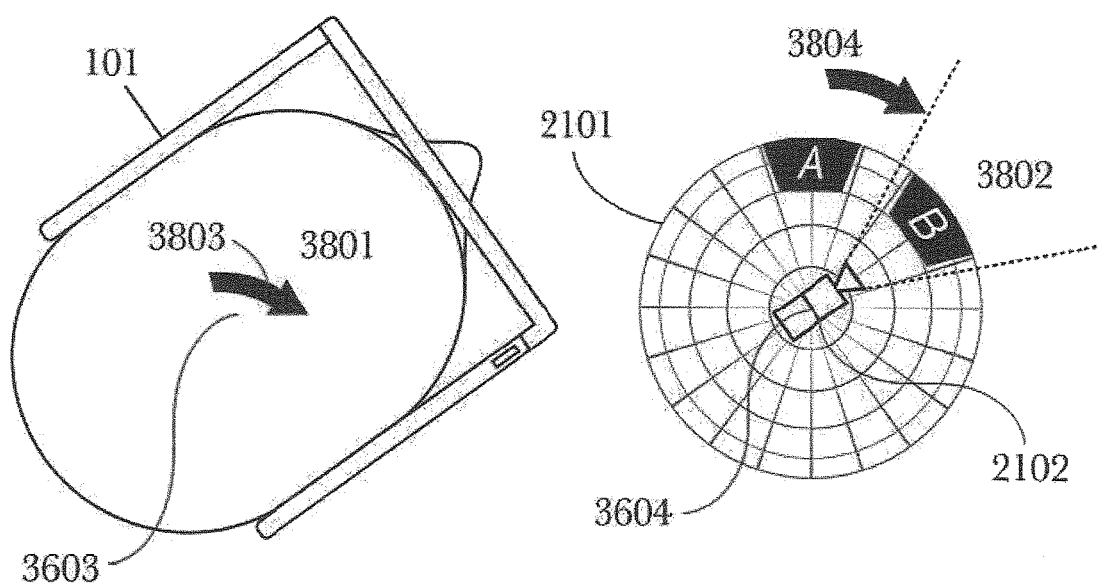
FIGS. 38A and 38B respectively illustrate a left view of an embodiment of a HMD and how changes to the y-axis rotation of the HMD have simultaneously changed the y-axis rotation of the render camera.

FIG. 38A illustrates a top view of a user 3801 wearing the device 101. In this illustration, the user has rotated their head to the right at an angle 3803 from its original position in FIG. 36A, thus changing the y-axis rotation of the device. In FIG. 38B, element 2102 shows the render camera inside the render object 2101. The y-axis 3604 rotation angle 3804 of the render camera 2102 has been simultaneously changed to match the y-axis 3603 rotation of the invention (and user's head). The render camera was able to accomplish this simultaneous change by using data provided by the orientation information acquisition device (Head Tracker). Element 3802 represents the updated user view as seen by the render camera 2102.

Figure 39:
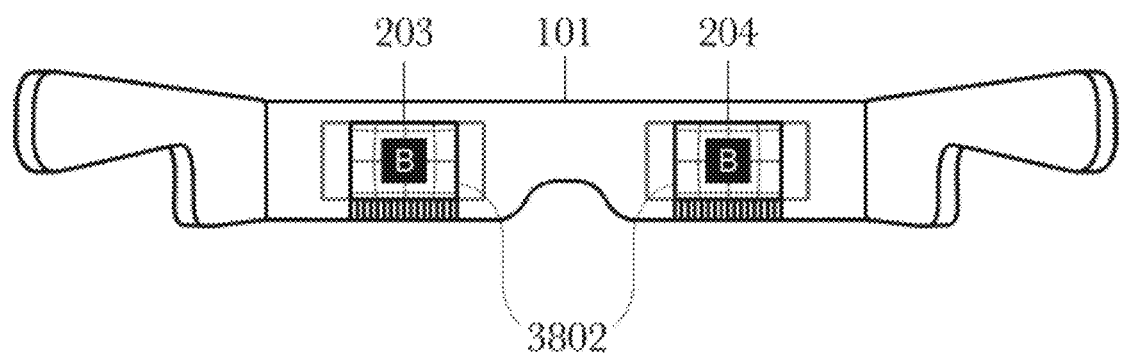
FIG. 39 illustrates an exemplary changed user view of the render camera of FIG. 38 being displayed on each of the displays of the HMD after the y-axis rotation of the HMD and render camera have been simultaneously changed.

FIG. 39 illustrates the back of an embodiment of the device 101 showing the updated user view 3802 of the render camera 2102 of FIG. 38 being presented in displays 203 and 204. In this illustration, we see the user view has changed based on the simultaneous changes to the y-axis rotation of both the invention 101 and the render camera 2102.

In some embodiments, the media file contains omnidirectional audio. In this case, the media file would contain two or more audio tracks, with each track containing audio recorded from an individual microphones facing different directions. The combined audio data from each track would collectively represent audio recorded from multiple directions. In the event the media file includes multiple audio tracks, the media viewer can independently adjust the volume of each individual audio track during playback of the media file based on the render camera's rotational position. The media viewer combines the audio data from each track for playback to the user via the speakers. The invention's integrated orientation information acquisition device (Head Tracker) will be able to directly control the render camera using head movements of the user, thus being able to independently adjust the volume of each individual audio track. The result is that the audio, heard by the HMD wearer via the speakers, will audibly reflect what is visually seen on the device displays. In other words, audio data (tracks) corresponding to video data that is not within the render camera's current angle of view is heard at a lower volume (track volume lowered) while audio data (tracks) corresponding to video data that is seen within the render camera's current angle of view is heard at a greater volume (track volume raised).

Figure 40A:
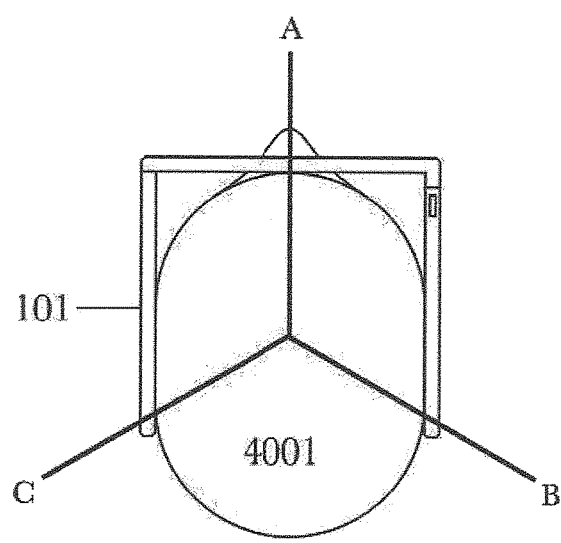
FIGS. 40A and 40B respectively illustrate a top view of an embodiment of a HMD and how the y-axis rotation value of the render camera can independently change the volume of individual audio tracks in the media file.
Figure 40B:
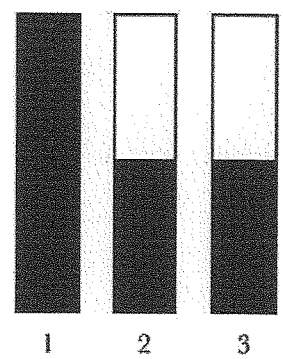

FIG. 40A illustrates a top view of a user 4001 wearing the device 101. The integrated orientation information acquisition device (Head Tracker) is able to determine the y-axis rotation of the user's head. In this example, the head tracker can determine the user is facing y-axis angle A, which is associated with audio track 1 of the media file. In response to facing direction A, the media viewer lowers the volume of audio track 2, which is associated with y-axis angle B and lowers the audio track of track 3, which is associated with y-axis angle C. FIG. 40B illustrates one such example of respective audio volume levels between the three tracks. Audio tracks 1, 2 and 3 are combined and presented to the user via the one or more speakers (earphones). The resulting effect is that the audio heard by the user reflects what is visually seen by the user facing angle A via the one or more displays of the invention.

Figure 41A:
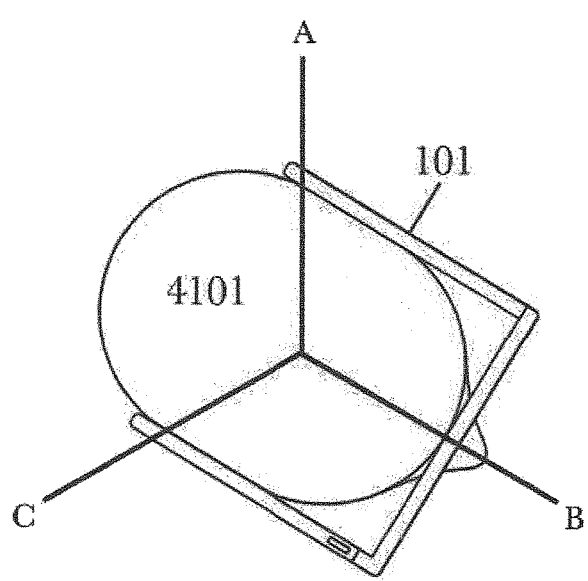
FIGS. 41A and 41B respectively illustrate a top view of an embodiment of a HMD and how the y-axis rotation value of the render camera can independently change the volume of individual audio tracks in the media file.
Figure 41B:
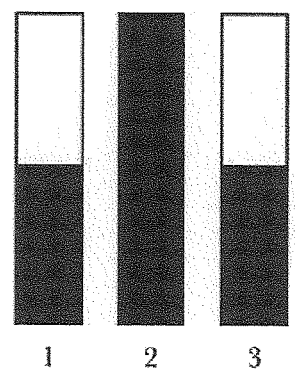

FIG. 41A illustrates a top view of a user 4101 wearing the device 101. The integrated orientation information acquisition device (Head Tracker) is able to determine the y-axis rotation of the user's head. In this example, the head tracker can determine if the user is facing y-axis angle B, which is associated with audio track 2 of the media file. In response to facing direction B, the media viewer lowers the volume of audio track 1, which is associated with y-axis angle A and lowers the audio track of track 3, which is associated with y-axis angle C. FIG. 41B illustrates one such example of respective audio volume levels between the three tracks. Audio tracks 1, 2 and 3 are combined and presented to the user via the one or more speakers (earphones). The resulting effect is that the audio heard by the user reflects what is visually seen by the user facing angle B via the one or more displays of the invention.

Figure 42A:
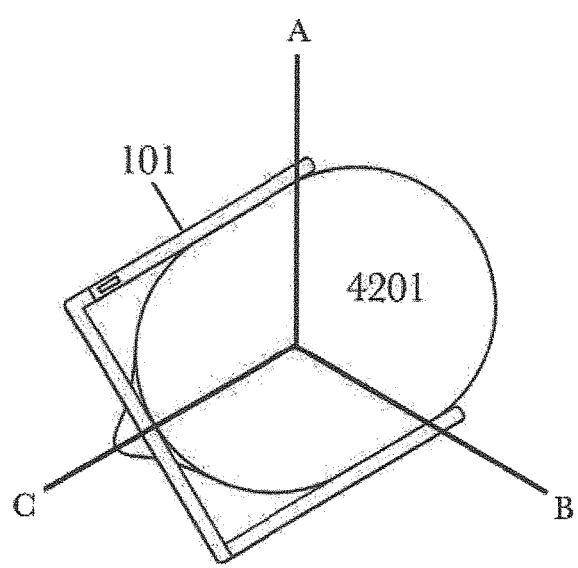
FIGS. 42A and 42B respectively illustrate a top view of an embodiment of a HMD and how the y-axis rotation value of the render camera can independently change the volume of individual audio tracks in the media file.
Figure 42B:
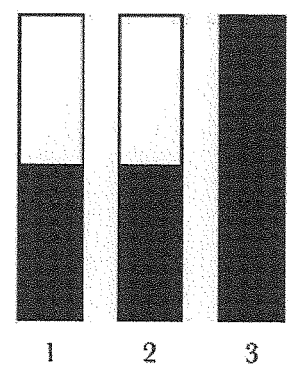

FIG. 42A illustrates a top view of a user 4201 wearing the device 101. The integrated orientation information acquisition device (Head Tracker) is able to determine the y-axis rotation of the user's head. In this example, the head tracker can determine the user is facing y-axis angle C, which is associated with audio track 3 of the media file. In response to facing direction C, the media viewer lowers the volume of audio track 1, which is associated with y-axis angle A and lowers the audio track of track 2, which is associated with y-axis angle B. FIG. 42B illustrates one such example of respective audio volume levels between the three tracks. Audio tracks 1, 2 and 3 are combined and presented to the user via the one or more speakers (earphones). The resulting effect is that the audio heard by the user reflects what is visually seen by the user facing angle C via the one or more displays of the invention.

A media file may additionally contain one or more supplemental media elements, such as images, videos, audio clips, 3D models and so forth. A "3D" element would, for example be added to the actual render sphere along an x-axis, y-axis and z-axis. A "2D" element, on the other hand would not be placed in the virtual environment (or the render sphere), but is instead shown on the screen as an overlay. Whether the media file contains supplemental media elements depends entirely on the device used to create the media files. If the media file contains supplemental media files, how and when they are used may be described by metadata tracks additionally included in the media file as well. As the media plays in the media viewer of the HMD, the software may read the metadata and change one or more properties of each supplemental media element according to the information described in the metadata. An example would be a media file containing omnidirectional video. Within the omnidirectional video, a picture frame is seen with nothing inside it. As the video plays the visual location of the video frame changes. To augment the video, the media file includes an image of a painting. The media file may contain metadata, whereby the image file of the painting would be added to the render object in a manner as to give the illusion that the painting is within the empty picture frame. This may be accomplished by changing various properties of the image file as the video plays, for example, changing the scale, rotation and position of the image so that it fits precisely in the picture frame. To accomplish this, it may be necessary to utilize another software application to build media files that includes both omnidirectional image (video) data, supplemental media files and the necessary metadata files to describe how to use them.

Figure 43:
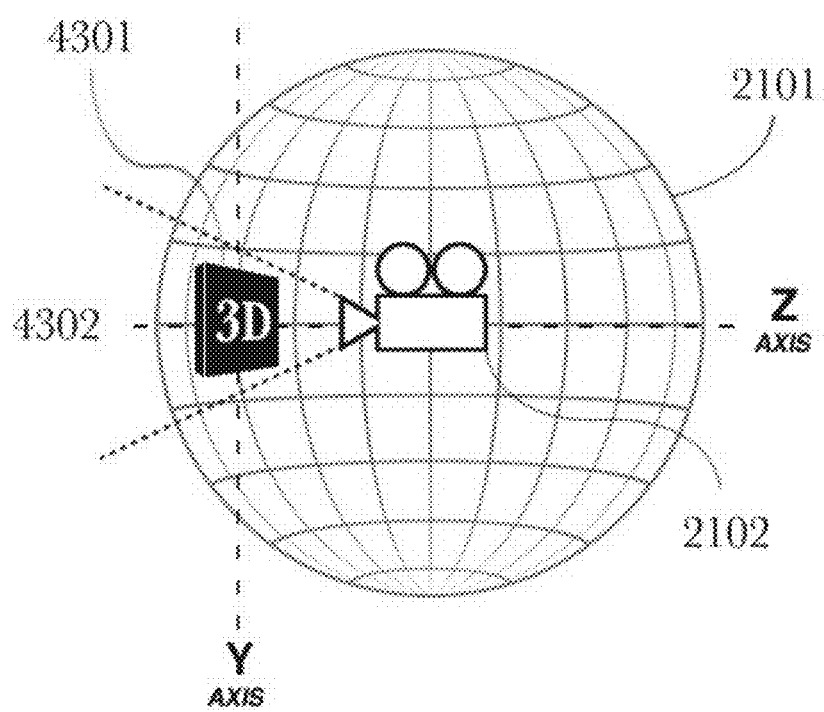
FIG. 43 illustrates an exemplary side view of a render object containing a 3D element, with the 3D element being rotated along its y-axis.

FIG. 43 illustrates an example of a supplemental 3D media element 4301 being added inside the render sphere 2101 of the virtual environment. The media element 4301 has been spatially moved along it's z-axis, towards the "edge" of the render sphere 2101 to appear further away from the render camera 2102. The media element has been also independently rotated on its own Y-Axis. This illustrates that 3D elements can be spatially positioned anywhere (along the x, y and z-axis) within the virtual environment (and render sphere) and also be independently rotated or scaled along its own x, y and z-axis. 4302 represents the user view as seen by the render camera. In this example, 3D media element 4301 can be seen by the render camera.

Figure 44:
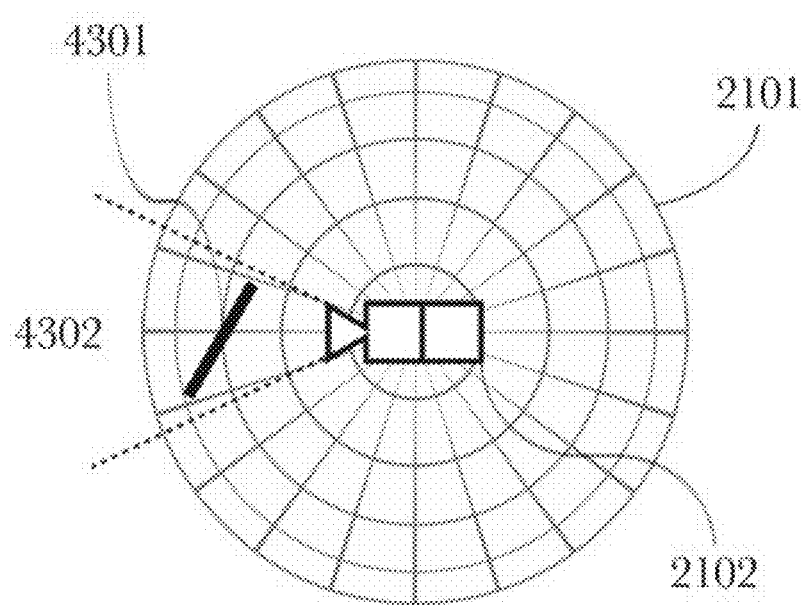
FIG. 44 illustrates an exemplary top view of a render object containing a 3D element, with the 3D Element being rotated along its y-axis.

FIG. 44 further illustrates FIG. 43 where we have a top view of the render sphere 2101 and render camera 2102. 4302 represents the user view as seen by the render camera. In this example, 3D media element 4301 can be seen by the render camera. FIG. 44 allows us to see that the 3D media element 4301 has been slightly rotated clockwise along its y-axis.

Figure 45:
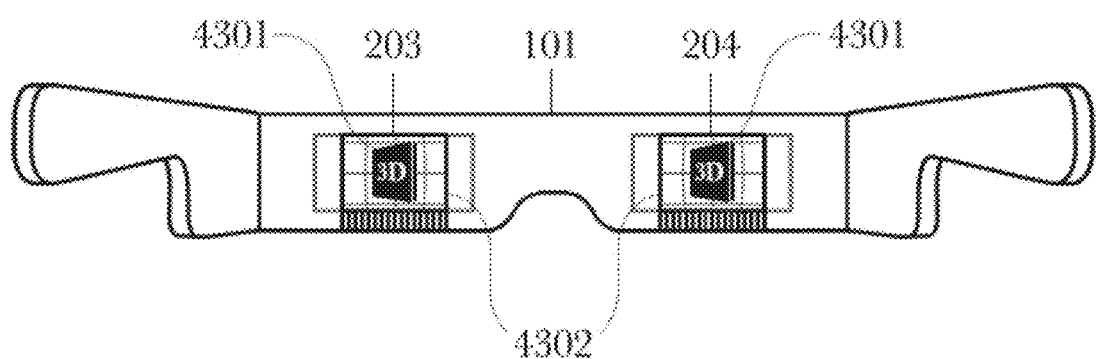
FIG. 45 illustrates a back view of an embodiment of a HMD showing an exemplary user view of the render camera of FIG. 43 and FIG. 44 being displayed on each of the displays of the HMD.

FIG. 45 illustrates the back of an embodiment of the device 101 showing the user view 4302 of the render camera 2102 of FIG. 44 being presented in displays 203 and 204. Within the user view shown in each display, the 3D media element 4301 is shown inside the render sphere 2101 of FIG. 44.

Figure 46:
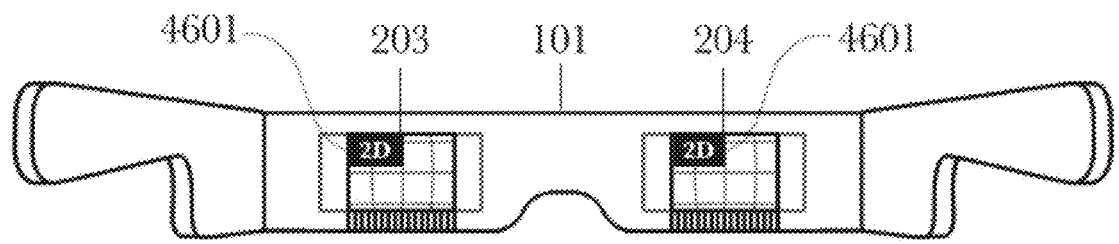
FIG. 46 illustrates a back view of an embodiment of a HMD showing an exemplary user view of the render camera containing a 2D Element displayed on each display of the device.

FIG. 46 illustrates the back of an embodiment of the device 101 showing an example user view of the render camera being presented in displays 203 and 204. Within the user view shown in each display, an example of a 2D media 4601 element is displayed at the top left the display. 2D elements are overlays that reside on the screen and are not part to the virtual environment or render object.

In some embodiments, the invention visually displays a user interface to the user, whereby visual elements including, but not limited to, images, 3D objects, 3D models, icons, videos, menus, buttons, sliders, switches, lists, and text are displayed on one or more of the displays. Elements of the user interface can provide various kinds of information, such as video timecode, information about the media file or a battery icon displaying the remaining battery level of the invention. Other interface elements are interactive, allowing the user to change their value, such as the volume of the device, or make various selections, such as choosing from a menu or a list. In addition to two-dimensional elements, the user interface may additionally utilize three-dimensional space and objects to present options to the user as well. The user will be able to navigate or otherwise control and use the user interface using various method including, but not limited to, the input controls 601, the head tracker, touch-sensitive surfaces, using voice-command recognition via the microphone 104 and using hand-gesture recognition via the camera 103.

Figure 47:
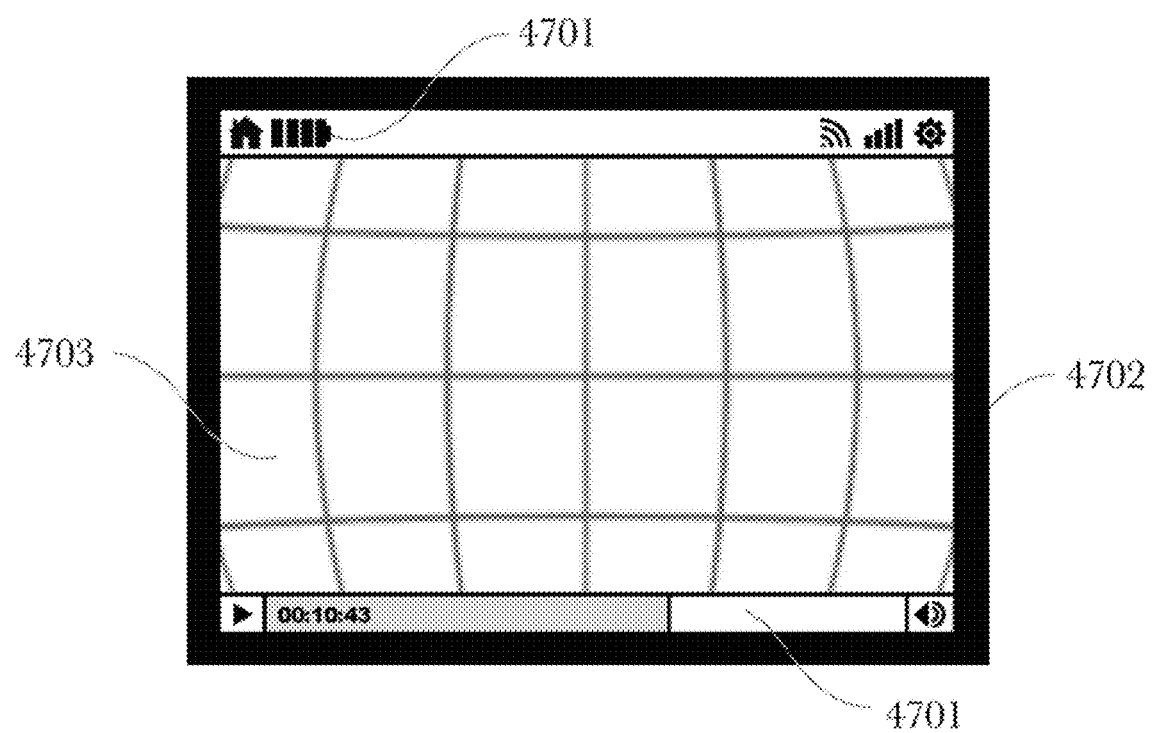
FIG. 47 illustrates an example of a user interface being displayed on a single display of a HMD.

FIG. 47 illustrates an example of a two-dimensional user interface elements 4701 being displayed on one display of the device 4702. In this example, we can see the render object 4703 being displayed behind the 2D interface elements 4701.

Figure 48:
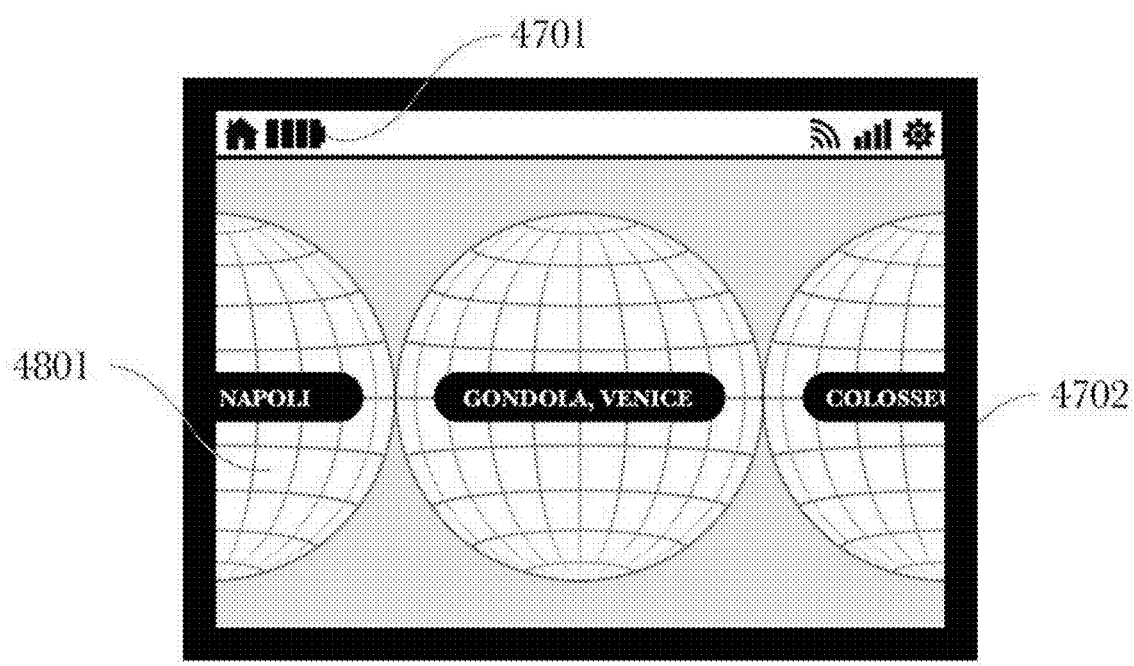
FIG. 48 illustrates an example of a user interface being displayed on a single display of a HMD.

FIG. 48 illustrates an example of two-dimensional user interface elements 4701 being displayed on one display of the device 4702. FIG. 48 also illustrates an example of a three-dimensional user interface system 4801 whereby the user can choose between different render objects (spheres) each representing a different media file.

Figure 49:
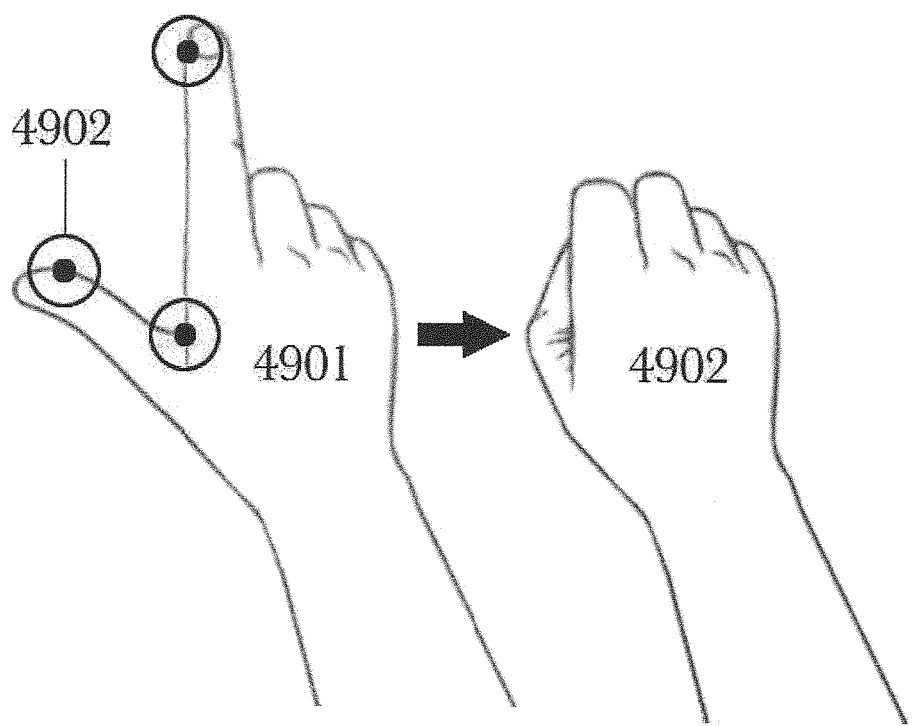
FIG. 49 illustrates an exemplary visual process by which hand gestures are recognized using visual key points.

FIG. 49 illustrates an example of how a hand gestures can be recognized by software running on the device. In this example, the camera 103 located on the front of the device 102 recognizes a number of key points 4902 to recognize that a hand 4901 is being positioned in front of the camera. Once the key points have been recognized by the software, tracked changes in the hand position can produce data that can be used to perform additional actions such as changing the render camera etc. FIG. 49 also provides an example of how the user would indicate to the software to stop the hand tracking. In this example the user closes their hand 4902 to stop hand tracking by preventing the software from seeing and tracking the previously recognized key points 4902.

Figure 50:
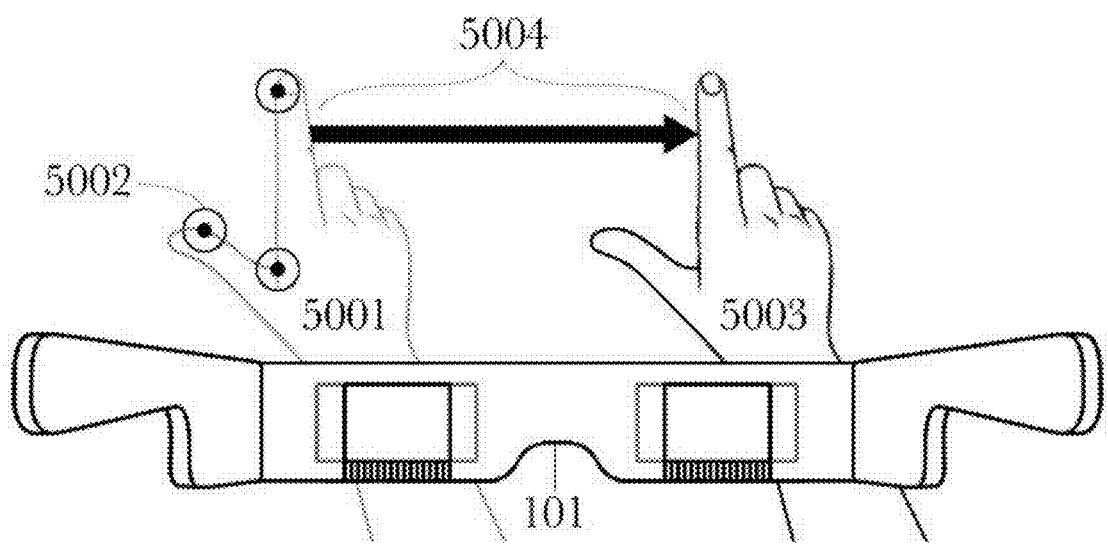
FIG. 50 illustrates an example of an embodiment of a HMD tracking of a hand gesture movements using a camera of the HMD.

FIG. 50 illustrates an example of a hand gesture being recognized by the software via the front camera 103 (not shown). Hand-gesture commands may be used to perform any device function, such as navigating the user interface and controlling the media viewer. Hand-gestures include, but are not limited to, shapes created by the hands (and fingers) and recognized hand movements, such as swipe gestures. For example, a user's hand 5001 creates an "L" shape hand gesture. The software running on the device 101 recognizes the hand gesture by recognizing multiple key points, here at 5002, and then begins tracking the hand movements. 5003 shows the hand after it has moved a specific distance 5004 from the original position of the hand 5001. The software is then able to perform one or more actions based on the data derived from the positional changes of the hand 5004. In addition to tracking hand movement, the software could additionally recognize a single hand gesture and perform actions based on that single gesture. The gesture could be performed by the user creating a unique shape with the hand and then performing another action, such as closing the hand 4902, to indicate the gesture should be stopped or has been completed. The hand-gesture recognition software may be optionally configured to avoid accidental use of hand-gesture recognition. For example, the software may first require activation of hand-gesture recognition via the user interface or via a voice command, such as "LISTEN . . . start hand gesture recognition" as captured by the microphone. In some embodiments, the device 101 includes a plurality of cameras for capturing hand gestures.

By providing multiple methods of operating the invention, including the input controls, head tracker, touch-sensitive surfaces, voice-command recognition and hand-gesture recognition, the device can be operated by a diverse range of users, each with their own preferred way of using the invention.

In some embodiments, the invention contains an integrated wireless communication module for communicating with remote servers, computing devices and other HMDs. Wireless communication would, for example, allow the invention to send and receive media files. Computing devices may include, but are not limited to, omnidirectional cameras, wireless enabled PCs, televisions, tablets, phones or other HMD systems. The integrated communication module would enable the invention to create its own ad-hoc wireless network or "hotspot". This would allow other devices to find and wirelessly connect to the invention quickly, easily and securely. To securely pair a device with the invention via the ad-hoc wireless network, security measures could be implemented, such as the need to provide a PIN code. In other embodiments the device would also contain a card slot for accepting a card-based wireless communication module, such as a cellular SIM card. This would allow the invention to utilize multiple wireless capabilities, such as Wi-Fi and cellular. In other embodiments, the invention may further include an integrated Near Field Communication (NFC) module for enabling close-proximity wireless transactions, data exchange, and device pairing. Using an NFC module, the HMD can be automatically paired to another device, such as an omnidirectional camera or other HMD by simply touching the two devices together. Used in this manner, an NFC module allows the secure pairing of the HMD and another device to be done quickly and easily.

Figure 53:
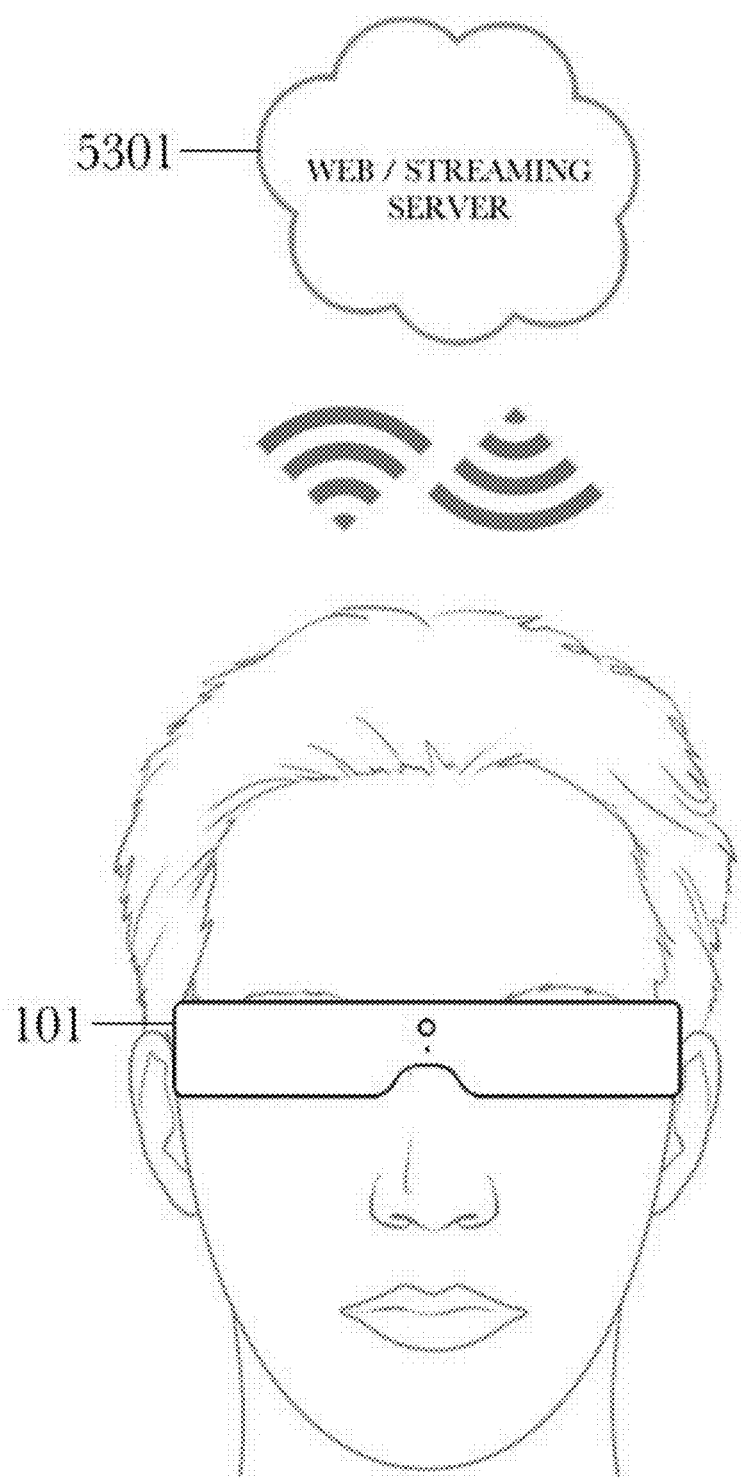
FIG. 53 illustrates an example of an embodiment of a HMD communicating wirelessly with a web/streaming server.

FIG. 53 illustrates an embodiment of device 101 worn by a user where the device has the capacity of communicating with a remote web/streaming server 5301. In some embodiments, the device 101 includes an integrated wireless communication module, such as a Wi-Fi and/or cellular chip, allowing the device to communicate with remote servers and other electronic devices. In other embodiments, the device 101 includes a card slot (not shown) for accepting a card-based wireless communication module, e.g., a cellular SIM card. The device would have the capacity to send and receive media files containing omnidirectional image data. Media files streamed from the streaming server to the invention 101 could contain pre-recorded content or be live events being broadcast to the streaming server from an omnidirectional video camera or an HMD. If the invention is capable of creating media files, the live or pre-recorded media files could be broadcast to the web/streaming server. In some embodiments, the device 101 includes one or more externally oriented input/output ports (not shown), such as a USB port or HDMI port, for transferring data between the device 101 and a computing device, display device, storage device, or other device, and for optionally receiving power for operating the device and recharging the internal battery.

Figure 54:
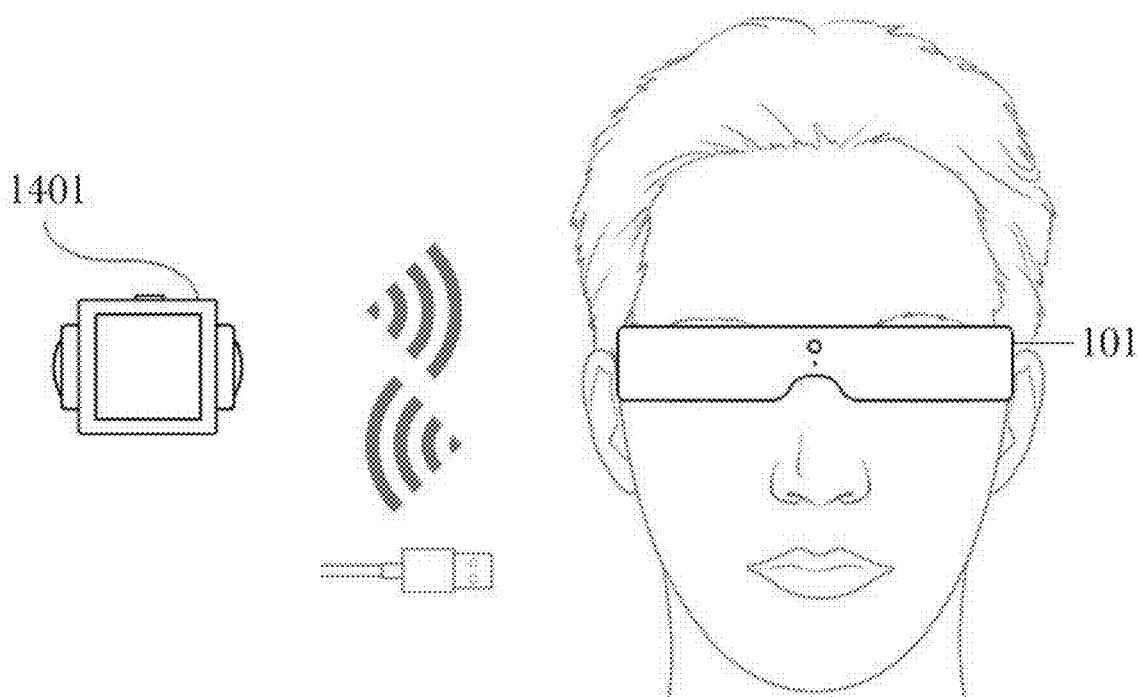
FIG. 54 illustrates an example of an embodiment of a HMD communicating wirelessly with an Omnidirectional Camera Device.

FIG. 54 illustrates an embodiment of device 101 worn by a user where the device has the capacity of communicating with an omnidirectional camera 1401 via a wired or wireless connection. Pre-recorded media files stored on the omnidirectional camera could be transmitted from the omnidirectional camera to the device. The device 101 would also have the capacity of receiving live broadcasts transmitted from the omnidirectional camera. In this case this would allow the invention 101 to experience a live, 1st person view of from the location of the omnidirectional camera. With the capacity of viewing live omnidirectional video, the invention has the capacity of offering telepresence capabilities that gives the wearer of the invention the sensation that they are physically at another location in real time.

Figure 55:
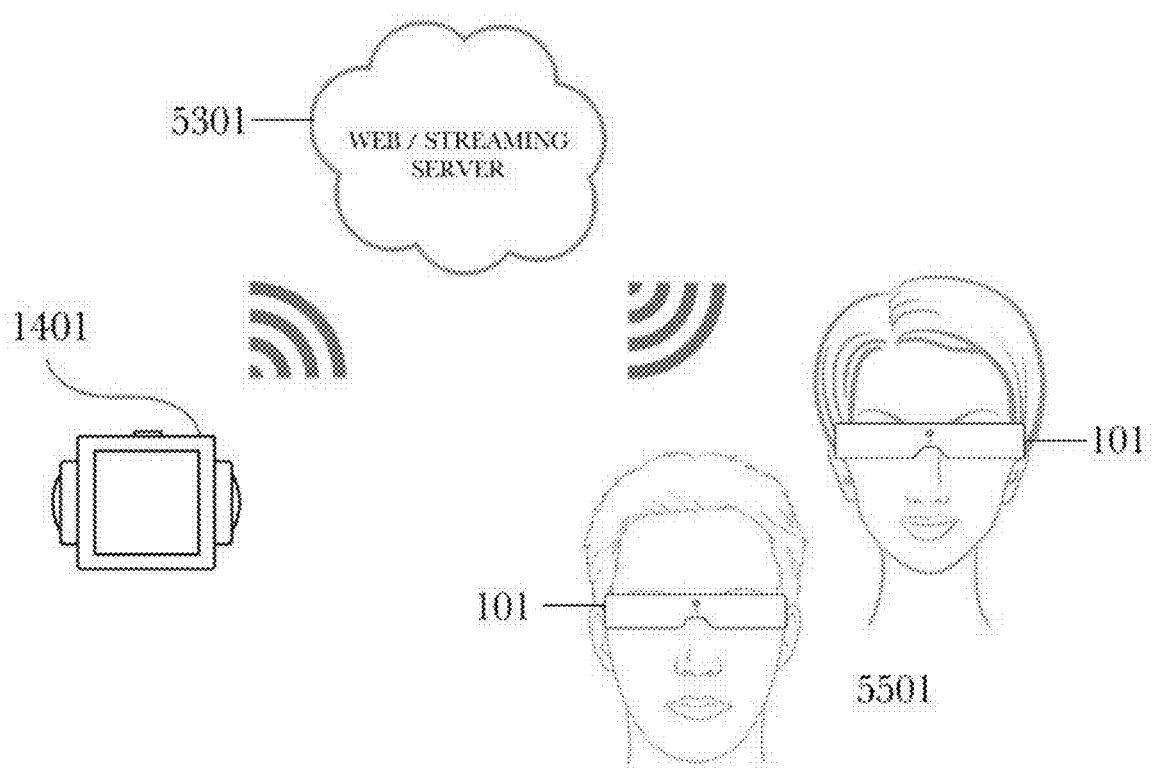
FIG. 55 illustrates an example of an embodiment of a HMD communicating wirelessly with an omnidirectional camera via a web/streaming server for receiving live media files.

FIG. 55 illustrates an example of multiple users 5501 wearing an embodiment of device 101 to simultaneously receive media files containing omnidirectional image data being streamed from a streaming server 5301. An omnidirectional camera would be able to broadcast live events by streaming the media files to a streaming server where one or more device users could "tune in" to the event by receiving the streaming files from the server. This would allow each user 5501 to have a 1st person view of the event from the position of the camera. For example, one or more omnidirectional cameras 1401 could be mounted at different locations at a sporting event where each camera is broadcasting live media files to a streaming server. Multiple users 5501 could then choose between the various streaming files being broadcast by each individual camera.

Figure 56:
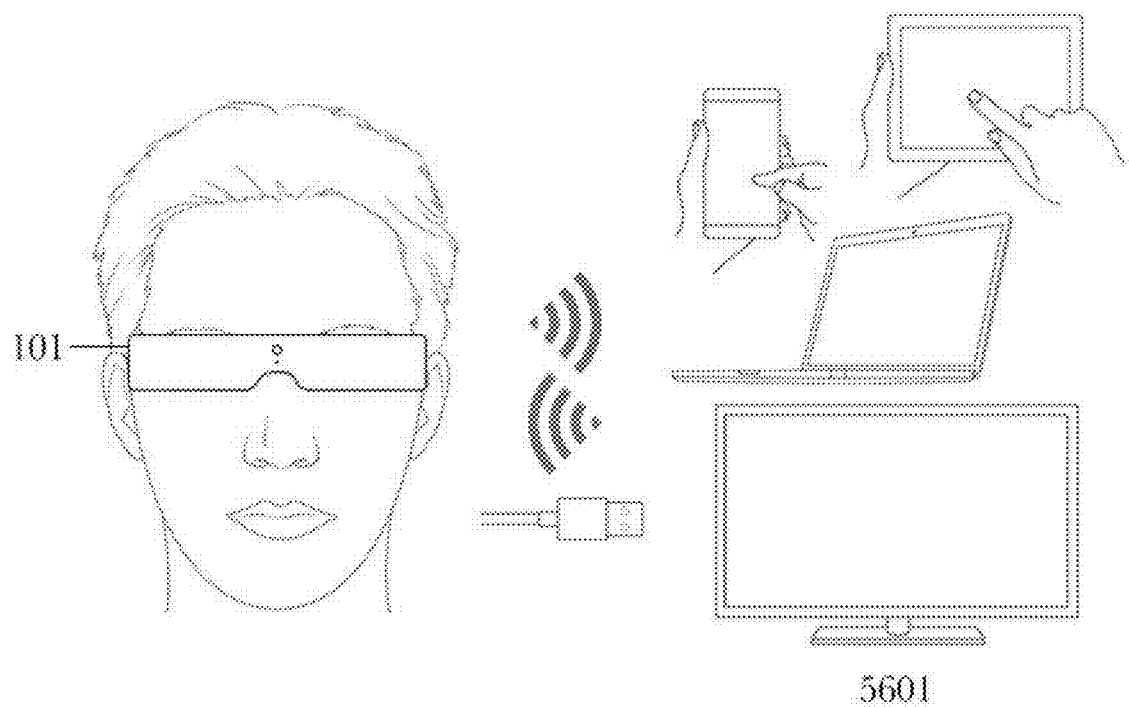
FIG. 56 illustrates an example of an embodiment of a HMD communicating with other computing devices, such as phones, tablets, personal computers and televisions via a wired or wireless connection.

FIG. 56 illustrates an embodiment of device 101 worn by a user where the device has the capacity of communicating with computing devices 5601 via a wired or wireless connection. These computing devices would include, but would not limited to, phones, tablets, personal computers and televisions.

Figure 57:
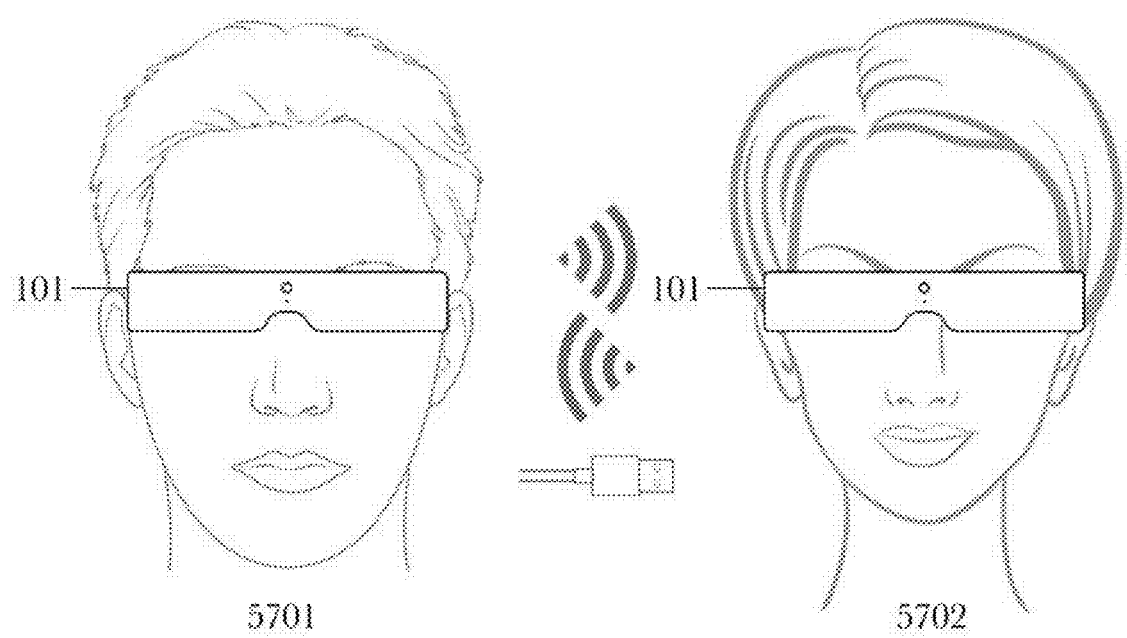
FIG. 57 illustrates an example of an embodiment of a HMD communicating with other HMDs via a wired or wireless connection.
Figure 58:
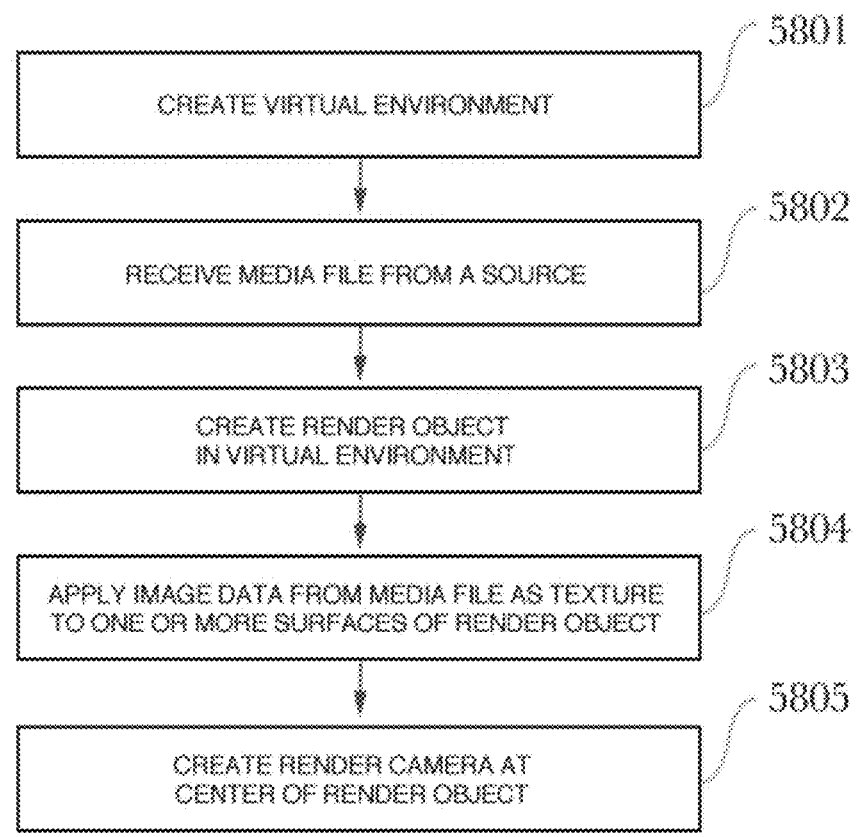
FIG. 58 illustrates an exemplary software process for displaying a media file containing omnidirectional image data in a media viewer executing on a HMD.

FIG. 57 illustrates an embodiment of device 101 worn by two separate users (5701 and 5702), whereby both devices have the capacity of communicating with each other via a wired or wireless connection. This would, for example, two or more users to simultaneously share media files with each other.

Figure 60:
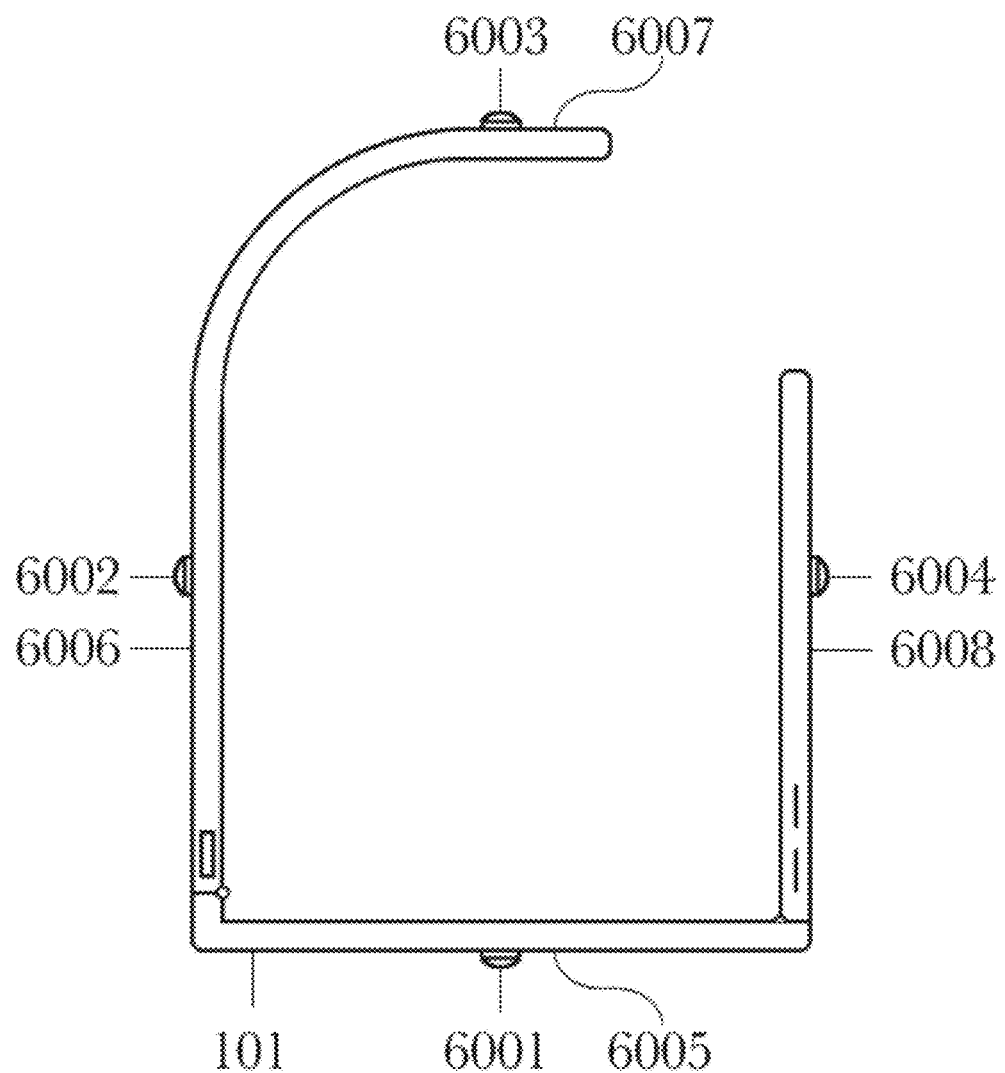
FIG. 60 illustrates a top view of an embodiment of a HMD including a plurality of cameras and microphones for recording a media file comprising omnidirectional image data and corresponding audio data.

In some embodiments, the device 101 will include a plurality of cameras and microphones for creating media files containing omnidirectional image data and corresponding audio data. This embodiment will allow the invention to both create and view media files and thus be considered both an omnidirectional camera and viewer. In this embodiment, a transparent or semi-transparent front, as illustrated in FIG. 10, would be preferred, as the wearer will need to see where they are moving while the invention is recording. FIG. 60 illustrates a top view of an embodiment of the invention containing multiple cameras and microphones to simultaneously record image and audio from multiple directions. In this example, the invention uses four cameras placed at the front 6001, right 6002, back 6003 and left side 6004 of the housing of the invention 101. To maximize the field of view of each camera wide angle lenses may be attached to each camera. This example also includes four microphones placed at the front 6005, right 6006, back 6007 and left side 6004 of the housing of the invention 101. The image data format produced by this embodiment can vary depending on a number of factors, such as the desired quality of the image data and the preferred retail costs of the device. Some firmware procedures, such as combining the image data via firmware to create a single image, such as an equirectangular image 1505, will require a more powerful processor and would thus increase the manufacturing costs of the device. To keep the manufacturing costs down, the device could take a simpler approach towards processing the image data, such as simply combining the image data together in a edge-to-edge format. This approach would require a less-powerful processor to create the media files but require the viewing device to have a processor powerful enough to view the format. If the invention is designed to both create and view media files, careful consideration would need to be taken to find the right approach towards creating media files.

Figure 61:
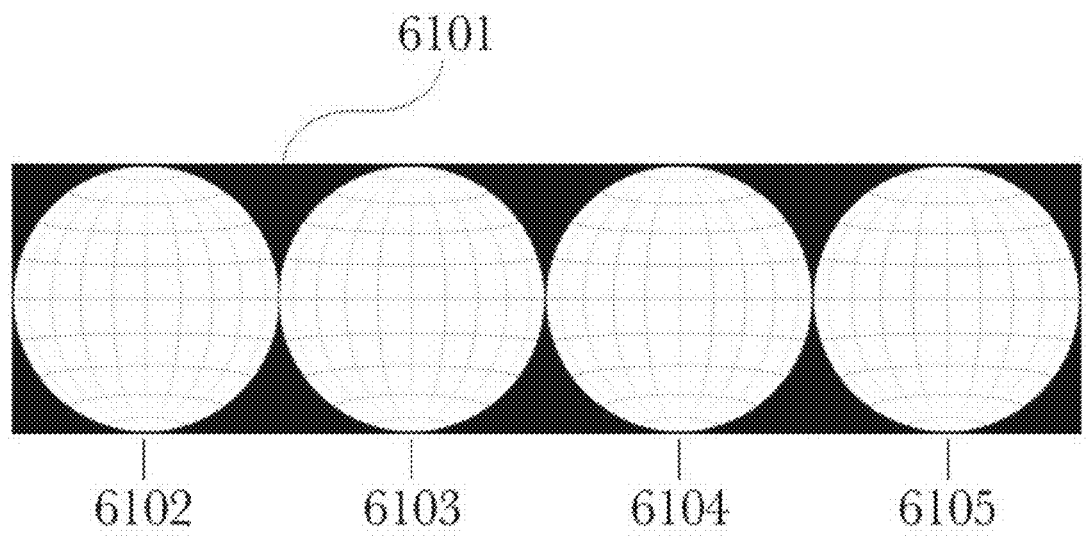
FIG. 61 illustrates an exemplary media file created by the embodiment of the HMD of FIG. 60. The illustration shows the image data simultaneously recorded from the plurality cameras of FIG. 60.

An example demonstrating an image format produced by this embodiment is shown in FIG. 61. In FIG. 61, the image data from the four cameras is combined edge-to-edge to form a single image 6101. This edge-to-edge format includes the image data 6102 produced from camera 6001, the image data 6103 produced from camera 6002, the image data 6104 produced from camera 6003 and image data 6105 produced from camera 6004. Another approach would be to add the image data from each camera as separate tracks, in this case four, or to perform additional image processing to seamlessly combine the image data from each camera into a single image, such as an equirectangular image 1505.

FIG. 62 illustrates a schematic diagram whereby the invention creates a media file containing image data acquired from each the cameras, audio data acquired each of the microphones, metadata acquired from the integrated Global Positioning System and metadata acquired from the integrated Orientation Information Acquisition Device. In this illustration, the orientation information acquisition device is comprised of an accelerometer and gyroscope. The process shows the creation of a new media file 6201 on the device's internal memory. The image data from each camera 6202 is then simultaneously acquired with the audio data from each microphone 6203. General File metadata 6204, such as the date and time, is created upon the media file creation and while Position metadata is acquired from the integrated Global Positioning System 6205 and Orientation metadata 6206 is acquired from the accelerometer and gyroscope. The image data from each camera undergoes a processing step 6207 whereby the image data of each camera is corrected, adjusted, transformed or otherwise modified depending on the desired format of the media file's image data.

The processing step may include, but is not limited to, cropping, rotating, scaling, transforming and combining the image data from one or more cameras. After the image processing step, the image data and audio data are then encoded 6208. The encoded image data, encoded audio data, file metadata, location metadata and orientation metadata are then saved to the media file 6209 on the internal storage or a card-based storage of the device 6210, to a connected device via the input/output port 6211, to another device via a wireless connection 6212 or to a web/streaming server via a wired or wireless connection 6213.

Although the subject matter has been described in language specific to structural features and/or methodologies, it is to be understood that the subject matter defined in the appended claims is not necessarily limited to the specific features or acts described above. Rather, the specific features and acts described above are disclosed as example forms of implementing the claims.

What is claimed is:

1. A Head Mounted Display (HMD) for viewing a media file including omnidirectional image data and corresponding audio data, said HMD comprising:

a housing, said housing being configured to be worn on a user's head with one or more portions of said housing positioned in front of said user's eyes;

a computer processor, said processor being located inside the housing;

a power source;

at least one display for receiving image data from said processor and displaying said received image data to the user;

at least one speaker for receiving audio data from said processor and playing said audio data to said user;

at least one input control said input control being located on the exterior of the housing;

an orientation sensor for measuring the rotation of said HMD about its x-axis, y-axis and z-axis; and a system memory having stored thereon computer-processor executable instructions for operating said HMD, said computer-processor executable instructions comprising instructions for displaying a media file including omnidirectional image data and corresponding audio data in a media viewer executing on said HMD via the at least one display, said instructions comprising:

executing, by the processor, a media viewer program;

generating, by the processor, a three-dimensional virtual environment;

receiving, by the processor, a media file from a source device;

creating, by the processor, a three-dimensional render object within the generated virtual environment;

setting, by the processor, one or more properties of the render object based on metadata contained in the media file, said properties including the shape, size and the rotation of the render object about its x-axis, y-axis, and z-axis;

applying, by the processor, the image data of the media file as a texture material to one or more surfaces of the render object;

positioning, by the processor, a virtual render camera inside the render object, said render camera defining a user view of the applied image data on one or more surfaces of the render object, said user view determined by the rotational position of the render camera along its x-axis, y-axis, and z-axis, the render camera's zoom value and the render camera's field of view value;

displaying, by the processor, the user view to the user via the at least one display;

playing, by the processor, the audio of the media file via the at least one speaker;

initiating, by the processor, a repeating render process, said render process comprising:

updating, by the processor, said texture material on said render object;

receiving, by the processor, user input, said user input including at least one of the orientation sensor data and input received via the at least one input control;

changing, by the processor, one or more properties of the render object based on one or more metadata values contained in the media file, said properties including the rotation of the render object about its x-axis, y-axis, and z-axis;

changing, by the processor, one or more properties of the render camera based on received user input, said properties including at least one of the rotation of the render camera about its x-axis, y-axis, and z-axis, the render camera's zoom value and the render camera's field of view value;

changing, by the processor, one or more properties of the image data based on received user input;

changing, by the processor, one or more properties of the audio data based on received user input;

updating, by the processor, the user view being displayed to the user via the at least one display; and updating, by the processor, the audio being played to the user via the at least one speaker.

2. The HMD of claim 1 further comprising at least one of an internal storage device and a card slot for accepting a card-based storage device.

3. The HMD of claim 1 further comprising at least one of an internal wireless communication module and a card slot for accepting a card-based wireless communication module.

4. The HMD of claim 1 further comprising one or more externally oriented input/output ports, said input/output ports enabling for at least one of data transfer and receiving power.

5. The HMD of claim 1, wherein said process further comprises independently changing the volume of each audio track in said media file based on at least one of said file metadata and one or more properties of said render camera.

6. The HMD of claim 1, said source device comprising at least one of a system memory, a storage device, a server, a camera and a computing device.

7. The HMD of claim 1, wherein said media file is received from a source device via at least one of a logical connection, a wired connection and wireless connection.

8. The HMD of claim 1 further comprising at least one camera and wherein said user input further includes receiving, by the processor, hand gestures via said at least one camera.

9. The HIVID of claim 1 further comprising at least one microphone and wherein said user input further includes receiving, by the processor, voice commands via said at least one microphone.

10. The HMD of claim 1, wherein said computer-processor executable instructions further comprise instructions for:

reading, by the processor, element data from said media file metadata, said element data describing one or more properties of one or more supplemental elements in said received media file, each supplemental element comprising at least one of 2D information, 3D information and audio information; and wherein said render process further includes:

selectively displaying, by the processor, each supplemental element having 3D information inside the render object;

selectively displaying, by the processor, each supplemental element having 2D information on the one or more displays;

selectively playing, by the processor, each supplemental element having audio information on said at least one speaker.

11. The HMD of claim 1, wherein said media files stored on said HMD are transmitted, by the processor, to at least one of a system memory, a server, a storage device and a computing device via at least one of a wired or wireless connection.

12. The HMD of claim 1, wherein said computer-processor executable instructions further comprise instructions for displaying a user interface in said media viewer, said user interface being operatively controlled by at least one of said orientation sensor data and said user input.

13. A Head Mounted Display (HMD) for viewing and creating media files including omnidirectional image data and corresponding audio data, said HMD comprising:

a housing, said housing being configured to be worn on a user's head with one or more portions of said housing positioned in front of said user's eyes;

a computer processor, said processor being located inside the housing;

a power source;

a plurality of cameras, each of said cameras being oriented in different directions for simultaneously acquiring image data;

at least one microphone for acquiring audio data;

at least one of an internal storage device and a card slot for accepting a card-based storage device;

at least one of an internal wireless communication module and a card slot for accepting a card-based wireless communication module;

at least one display for receiving image data from said processor and displaying said received image data to the user;

at least one speaker for receiving audio data from said processor and playing said audio data to said user;

at least one input control, said input control being located on the exterior of the housing;

an orientation sensor for measuring the rotation of said HMD about its x-axis, y-axis and z-axis; and a system memory having stored thereon computer-processor executable instructions for operating said HMD, said computer-processor executable instructions comprising instructions for displaying a media file including omnidirectional image data and corresponding audio data in a media viewer executing on said HMD via the at least one display, said instructions comprising:

executing, by the processor, a media viewer program;

generating, by the processor, a three-dimensional virtual environment;

receiving, by the processor, a media file from a source device, said source device comprising at least one of a system memory, a storage device, a server, a camera and a computing device, creating, by the processor, a three-dimensional render object within the generated virtual environment;

setting, by the processor, one or more properties of the render object based on metadata contained in the media file, said properties including the shape, size and the rotation of the render object about its x-axis, y-axis, and z-axis;

applying, by the processor, the image data of the media file as a texture material to one or more surfaces of the render object;

positioning, by the processor, a virtual render camera at the center of inside the render object, said render camera defining a user view of the applied image data on one or more surfaces of the render object, said user view determined by the rotational position of the render camera along its x-axis, y-axis, and z-axis, the render camera's zoom value and the render camera's field of view value;

displaying, by the processor, the user view to the user via the at least one display;

playing, by the processor, the audio of the media file via the at least one speaker;

initiating, by the processor, a repeating render process, said render process comprising:

updating, by the processor, said texture material on said render object;

receiving, by the processor, user input, said user input including at least one of the orientation sensor data and input received via the at least one input control;

changing, by the processor, one or more properties of the render object based on one or more metadata values contained in the media file, said properties including the rotation of the render object about its x-axis, y-axis, and z-axis;

changing, by the processor, one or more properties of the render camera based on received user input, said properties including at least one of the rotation of the render camera about its x-axis, y-axis, and z-axis, the render camera's zoom value and the render camera's field of view value;

changing, by the processor, one or more properties of the image data based on received user input;

changing, by the processor, one or more properties of the audio data based on received user input;

updating, by the processor, the user view being displayed to the user via the at least one display; and updating, by the processor, the audio being played to the user via the at least one speaker;

and where said computer-processor executable instructions for operating said HMD further comprise instructions for creating a new media file including omnidirectional image data and corresponding audio data, said instruction comprising:

creating, by the processor, a new media file;

acquiring, by the processor, image data synchronously from each of said plurality of cameras;

acquiring, by the processor, audio data from said at least one microphone synchronously with said image data;

acquiring, by the processor, file metadata describing one or more properties of the new media file;

acquiring, by the processor, orientation metadata from said orientation sensor, said orientation metadata describing the rotation of said HMD about its x-axis, y-axis and z-axis;

encoding, by the processor, said acquired image data from each of said plurality of cameras;

encoding, by the processor, said acquired audio data from said at least one microphone;

adding, by the processor, said encoded image data, said encoded audio data, said acquired metadata and said acquired orientation metadata to said new media file; and saving, by the processor, said new media file to at least one of a system memory, a server, a storage device and a computing device via at least one of a wired or wireless connection.

14. The HMD of claim 13 further comprising a Global Positioning System (GPS) and where said computer-processor executable instructions for creating a new media file further comprise:

acquiring, by the processor, position metadata from said GPS describing the global position of said HMD; and adding, by the processor, said acquired position data to said new media file.

* * * * *